United States Patent
Shiozaki et al.

(10) Patent No.: US 7,691,535 B2
(45) Date of Patent: Apr. 6, 2010

(54) ACTIVE SUBSTANCE OF POSITIVE ELECTRODE AND NON-AQUEOUS ELECTROLYTE BATTERY CONTAINING THE SAME

(75) Inventors: Ryuji Shiozaki, Osaka (JP); Akihiro Fujii, Osaka (JP); Tokuo Inamasu, Osaka (JP); Hiroe Nakagawa, Osaka (JP); Suguru Kozono, Osaka (JP); Toshiyuki Nukuda, Osaka (JP)

(73) Assignee: GS Yuasa Corporation, Minami-ku, Kyoto-shi (JP)

( * ) Notice: Subject to any disclaimer, the term of this patent is extended or adjusted under 35 U.S.C. 154(b) by 877 days.

(21) Appl. No.: 10/500,819

(22) PCT Filed: Mar. 26, 2003

(86) PCT No.: PCT/JP03/03691

§ 371 (c)(1),
(2), (4) Date: Jul. 7, 2004

(87) PCT Pub. No.: WO03/081698

PCT Pub. Date: Oct. 2, 2003

(65) Prior Publication Data

US 2005/0019659 A1    Jan. 27, 2005

(30) Foreign Application Priority Data

Mar. 27, 2002  (JP) ............................. 2002-088229
May 14, 2002  (JP) ............................. 2002-137870

(51) Int. Cl.
*H01M 4/52* (2006.01)
*H01M 4/50* (2006.01)

(52) U.S. Cl. ................. 429/231.3; 429/231.1; 429/223; 429/224; 423/594.4; 423/594.6; 423/599

(58) Field of Classification Search .................. None
See application file for complete search history.

(56) References Cited

U.S. PATENT DOCUMENTS 6,040,090 A * 3/2000 Sunagawa et al. ...... 429/231.95

(Continued)

FOREIGN PATENT DOCUMENTS

EP    0 390 185 A2    10/1990

(Continued)

OTHER PUBLICATIONS

European Search Report dated Nov. 29, 2007.

(Continued)

*Primary Examiner*—Jonathan Crepeau
*Assistant Examiner*—Tony Chuo
(74) *Attorney, Agent, or Firm*—McGinn IP Law Group, PLLC

(57) ABSTRACT

A positive active material is provided which can give a battery having a high energy density and excellent high-rate discharge performance and inhibited from decreasing in battery performance even in the case of high-temperature charge. Also provided is a non-aqueous electrolyte battery employing the positive active material. The positive active material contains a composite oxide which is constituted of at least lithium (Li), manganese (Mn), nickel (Ni), cobalt (Co), and oxygen (O) and is represented by the following chemical composition formula: $Li_aMn_bNi_cCo_dO_e$ (wherein $0<a\leq1.3$, $|b-c|\leq0.05$, $0.6\leq d<1$, $1.7\leq e\leq2.3$, and $b+c+d=1$). The non-aqueous electrolyte battery has a positive electrode containing the positive active material, a negative electrode, and a non-aqueous electrolyte.

20 Claims, 4 Drawing Sheets

U.S. PATENT DOCUMENTS

| | | | |
|---|---|---|---|
| 6,964,828 B2 | 11/2005 | Lu et al. | |
| 2002/0061443 A1* | 5/2002 | Nakanishi et al. | 429/223 |
| 2003/0180617 A1* | 9/2003 | Fujimoto et al. | 429/231.1 |

FOREIGN PATENT DOCUMENTS

| | | | |
|---|---|---|---|
| EP | 0 872 450 A1 | | 10/1998 |
| EP | 1 100 133 A2 | | 5/2001 |
| EP | 1 189 296 A2 | | 3/2002 |
| EP | 1 193 782 A1 | | 4/2002 |
| EP | 1 193 782 A2 | | 4/2002 |
| EP | 1 295 851 A1 | | 3/2003 |
| EP | 1 447 866 A1 | | 8/2004 |
| JP | 4-106875 | | 4/1992 |
| JP | 05-242891 | * | 9/1993 |
| JP | 5-242891 | | 9/1993 |
| JP | 07-235291 | | 9/1995 |
| JP | 8-213015 | | 8/1996 |
| JP | 10-255846 | | 9/1998 |
| JP | 10-289731 | * | 10/1998 |
| JP | 11-242959 | | 9/1999 |
| JP | 2000-77071 | | 3/2000 |
| JP | 2000-077071 | * | 3/2000 |
| JP | 2000-315503 | | 11/2000 |
| JP | 2002-100358 | | 4/2002 |
| JP | 2002-110253 | | 4/2002 |
| JP | 2002-151076 | | 5/2002 |
| JP | 2002-304993 | | 10/2002 |
| JP | 2003-17060 | | 1/2003 |
| JP | 2003-59490 | | 2/2003 |
| JP | 2003-92108 | | 3/2003 |
| JP | 2003-142075 | | 5/2003 |
| JP | 2003-142091 | | 5/2003 |
| JP | 2003-229128 | | 8/2003 |

OTHER PUBLICATIONS

European Search Report dated Jul. 26, 2007.

Cho, et al., "Enhancement of Thermal Stability of $LiCoO_2$ by $LiMin_2O_4$ Coating" Electrochemical and Solid-State Letters, IEEE Service Center, Piscataway, NJ, US, vol. 2, No. 6, Jun. 1999, pp. 253-255.

Lu, et al., "Layered Li[Ni (x)Co(1-2x)Mn(x)] 02 Cathode Materials for Lithium-Ion Batteries" Electrochemical and Solid-State Letters, IEEE Service Center, Piscataway, NJ, US, vol. 4, No. 12, Dec. 2001 pp. A200-A203.

Japanese Office Action dated May 20, 2009 with an English translation.

* cited by examiner

ACTIVE SUBSTANCE OF POSITIVE ELECTRODE AND NON-AQUEOUS ELECTROLYTE BATTERY CONTAINING THE SAME

TECHNICAL FIELD

The present invention relates to positive active materials and non-aqueous electrolyte batteries employing the same. More particularly, the invention relates to positive active materials which have a high energy density and excellent high-rate discharge performance and are inhibited from causing a decrease in battery performance even in high-temperature charge, and to non-aqueous electrolyte batteries employing the positive active materials. The invention further relates to a non-aqueous electrolyte battery which retains the high thermal stability characteristic of lithium-manganese oxides having a spinel structure, has a high energy density and excellent high-rate discharge performance, is inhibited from suffering self-discharge, and has excellent storage performance.

BACKGROUND ART

Non-aqueous electrolyte secondary batteries such as lithium secondary batteries are extensively used as power sources for small portable terminals, mobile communication apparatus, and the like because these batteries have a high energy density and a high voltage can be taken out thereof.

At present, an Li—Co composite oxide having a layer structure belonging to the space group R3-m (hereinafter referred to also as $LiCoO_2$) is mainly used as a positive active material in lithium secondary batteries for small public-use applications. The reasons for this are that the $LiCoO_2$ shows a flat discharge potential profile at around 3.9 V (vs. $Li/Li^+$) and that since the delay grade of lithium ion diffusion in the solid $LiCoO_2$ phase even in the final stage of discharge is small, the discharge polarization accompanying on the delay can be diminished and high energy can be taken out over a prolonged time period. In addition, even when lithium ions are extracted to about 4.3 V (vs. $Li/Li^+$) in the charge direction, the crystal structure retains a rhombohedral crystal and, hence, the composite oxide is excellent also in charge/discharge cycle performance. As described above, the $LiCoO_2$ is a positive active material which has a high energy density and satisfactory charge/discharge cycle performance.

With respect to expressions of space groups, the expression "R3m" should originally bear a bar (lateral line) affixed over the numeral "3". In this description, however, the expression "R3-m" is used for convenience so as to show the same meaning.

Positive active materials likewise having an operating potential at around 4 V include lithium nickelate ($LiNiO_2$). However, the $LiNiO_2$ has problems that it has a lower discharge potential than the $LiCoO_2$ although it has a high theoretical discharge capacity, and that the active material has poor thermal stability in charged state. There are hence many unsolved problems in putting this active material into practical use.

Lithium manganate ($LiMn_2O_4$) also can be made to have an operating potential around 4 V and to show a flat discharge potential profile by partly displacing the manganese sites by lithium. However, there has been a problem that this active material has a low theoretical discharge capacity and a problem that a manganese species dissolves away from the active material in a high-temperature environment and this causes a decrease in battery performance. It is explained that the problem of this manganese species dissolution is attributable to the Jahn-Teller strain of trivalent manganese.

Many investigations are being made also on materials represented by the chemical composition formula $LiCo_xNi_{1-x}O_2$. This kind of active material is thought to be based on the idea that the merits of both of two active materials, i.e., $LiCoO_2$ and $LiNiO_2$, are imparted by utilizing the fact that $LiCoO_2$—$LiNiO_2$ forms a solid solution throughout the whole compositional range. However, due to the introduction of nickel, this active material also has poorer thermal stability during charge than the $LiCoO_2$ described above. In this point, this active material is not superior in properties to the $LiCoO_2$.

Since the $LiCoO_2$ shows most satisfactory performances among the currently known active materials of the 4-V class, it has come to be used almost exclusively in the market for small public-use appliances. However, the recent trend toward higher performances in small communication apparatus is remarkable and there is a strong desire for a further improvement in battery performance.

For the purpose of further improving the properties of the $LiCoO_2$ described above, a technique in which cobalt sites in the crystal structure of the $LiCoO_2$ are displaced by the element of Zn, Cu, Si, Mg, P, Be, Ca, Sr, Ba, or Ra is reported in Japanese Patent No. 3,162,437 and a technique in which the sites are displaced by aluminum element is reported in JP-A-11-7958 and JP-A-11-73958. However, there has been a problem that since these displacing elements undergo no electrode reaction at around 4 V, the presence of these displacing elements in the active material reduces the discharge capacity. Especially when aluminum element is contained in the active material, there has been a problem that the presence thereof lowers the bulk density of the active material and hence reduces the energy density of the battery.

There has further been a problem that when the $LiCoO_2$ is charged at a high temperature, lithium ions tend to be excessively extracted. When excessive extraction of lithium ions occurs during charge, the negative-electrode side functions to incorporate the excess lithium thereinto. That part of the lithium which remains undoped during this charge is thought to deposit as lithium metal on the negative electrode. The lithium metal which has thus deposited hardly redissolves to become utilizable as an active material. Because of this, not only the battery capacity decreases, but also there has been a possibility that the lithium deposited might penetrate the separator to cause internal short-circuiting.

On the other hand, in large batteries intended to be used in electric motorcars or power storage, the active materials to be used in the electrodes are required to have high thermal stability, for example, because the electrodes have a large size and the batteries are susceptible to heat buildup. Consequently, use of lithium-nickel oxides or lithium-cobalt oxides as a positive active material for such large batteries is avoided, and a lithium-manganese oxide having a spinel structure tends to be employed as the positive active material for the batteries because of its high thermal stability.

However, the lithium-manganese oxide having a spinel structure has had problems that the energy density thereof per unit weight is as low as about 70% of that of the lithium-cobalt oxides, and that with respect to storage performance and charge/discharge cycle performance, the rate of active-material deterioration represented by the deactivation accompanying $Mn^{2+}$ dissolution is high, resulting in a short battery life.

From these standpoints, a technique of using a positive electrode comprising a mixture of a lithium-manganese oxide having a spinel structure ($Li_{1+x}Mn_2O_4$ or $Li_{1+x}Mn_{2-z}M_zO_4$), $LiCoO_2$, $LiCo_{1-x}Ni_xO_2$, and polyaniline for the purpose of improving energy density is disclosed in JP-A-2001-319647.

A feature of this technique resides in that the amount of lithium which is deactivated by, e.g., film formation on the negative electrode during first charge can be compensated for by mixing the lithium-manganese oxide with $LiCo_{1-x}Ni_xO_2$, which has a high charge capacity, and with polyaniline and, hence, an increase in battery capacity can be attained. However, since the $LiCo_{1-x}Ni_xO_2$ has insufficient thermal stability, use of this positive electrode in large batteries has been problematic even when the proportion of the oxide is small. There has further been a problem that since polyaniline has a charge/discharge reaction region around 3 V, the polyaniline hardly contributes to charge capacity in that combination, which is intended to be mainly used in a 4-V region.

Furthermore, JP-A-2002-100358 discloses a technique in which a mixture of a lithium-nickel-manganese-M composite oxide represented by $Li_xNi_yMn_{1-y-z}M_zO_2$ (wherein x is $0.9 \leq x \leq 1.2$, y is $0.40 \leq y \leq 0.60$, z is $0 \leq z \leq 0.2$, and M is one member selected from Fe, Co, Cr, and Al atoms) and a lithium-manganese spinel composite oxide having an Fd3m spinel structure and represented by $Li_pMn_2O_4$ (wherein p is $1 \leq p \leq 1.3$) is used. However, there has been a problem that since the $Li_xNi_yMn_{1-y-z}M_zO_2$ is an active material having poorer high-rate discharge performance than the lithium-manganese oxide having a spinel structure as pointed out in that patent document, a lithium secondary battery having excellent high-rate discharge performance cannot be obtained.

An object of the invention, which has been achieved in view of the problems described above, is to provide a positive active material which can give a battery having a high energy density and excellent high-rate discharge performance and inhibited from decreasing in battery performance even in the case of high-temperature charge, and to provide a non-aqueous electrolyte battery employing the positive active material.

Another object of the invention is to provide a non-aqueous electrolyte battery which retains the high thermal stability characteristic of lithium-manganese oxides having a spinel structure, has a high energy density and excellent high-rate discharge performance, is inhibited from suffering self-discharge, and has excellent storage performance.

DISCLOSURE OF THE INVENTION

As a result of intensive investigations made by the present inventors in order to overcome the problems described above, it has been found that a non-aqueous electrolyte battery which has a high energy density and is excellent in high-rate discharge performance and high-temperature charge performance is obtained by using a composite oxide having a specific composition as a positive active material. The invention has been thus achieved.

The present inventors further made intensive investigations on active materials to be used as a mixture with a lithium-manganese oxide having a spinel structure especially for the purpose of improving high-rate discharge performance while giving their mind to application especially to large batteries. As a result, it has been found that by using a mixture of a lithium-manganese oxide (A) having a spinel structure and the composite oxide (B), a non-aqueous electrolyte battery having a high energy density and excellent in high-rate discharge performance and storage performance is obtained without impairing high thermal stability. The invention has been thus achieved.

Namely, the technical constitutions of the invention and the effects and advantages thereof are as follows. It is, however, noted that the explanations on the mechanisms of the effects include presumptions and whether these explanations are correct or not does not limit the scope of the invention.

That is, the invention provides the following (1) to (5).

(1) A positive active material comprising a composite oxide which is constituted of at least lithium (Li), manganese (Mn), nickel (Ni), cobalt (Co), and oxygen (O) and is represented by the following chemical composition formula:

$Li_aMn_bNi_cCo_dO_e$  (Chemical composition formula 1)

(wherein $0<a \leq 1.3$
$|b-c| \leq 0.05$
$0.6 \leq d < 1$
$1.7 \leq e \leq 2.3$
$b+c+d=1$).

(2) A positive active material comprising a composite oxide which is constituted of at least lithium (Li), manganese (Mn), nickel (Ni), cobalt (Co), and oxygen (O) and is represented by the following chemical composition formula:

$Li_aMn_bNi_cCo_dO_e$  (Chemical composition formula 1)

(wherein $0<a \leq 1.3$
$|b-c|<0.03$
$0.8 \leq d < 1$
$1.7 \leq e \leq 2.3$
$b+c+d=1$).

(3) A non-aqueous electrolyte battery having a positive electrode containing the positive active material as described in (1) or (2) above, a negative electrode, and a non-aqueous electrolyte.

(4) A non-aqueous electrolyte battery having a positive electrode, a negative electrode, and a non-aqueous electrolyte, characterized in that the positive electrode contains a lithium-manganese oxide (A) having a spinel structure and represented by the general formula $LiMn_2O_4$ and a lithium-nickel-manganese-cobalt composite oxide (B) having an α-NaFeO$_2$ type layer structure and represented by the general formula $Li_aMn_bNi_cCo_dO_e$,
wherein
$0<a \leq 1.3$
$|b-c| \leq 0.05$
$0.6 \leq d < 1$
$1.7 \leq e \leq 2.3$
$b+c+d=1$.

(5) A non-aqueous electrolyte battery having a positive electrode, a negative electrode, and a non-aqueous electrolyte, characterized in that the positive electrode contains a lithium-manganese oxide (A) having a spinel structure and represented by the general formula $LiMn_2O_4$ and a lithium-nickel-manganese-cobalt composite oxide (B) having an α-NaFeO$_2$ type layer structure and represented by the general formula $Li_aMn_bNi_cCo_dO_e$,
wherein
$0<a \leq 1.3$
$|b-c|<0.03$
$0.8 \leq d < 1$
$1.7 \leq e \leq 2.3$
$b+c+d=1$.

(6) The non-aqueous electrolyte battery as described in (4) or (5) above, characterized in that the positive electrode contains the (A) and the (B) in a proportion (weight ratio) of from 5:95 to 90:10.

According to the constitutions of (1) to (3) above, positive active materials can be provided which can give a non-aqueous electrolyte battery having a high energy density and excellent high-rate discharge performance and inhibited from decreasing in battery performance even in the case of high-temperature charge. Non-aqueous electrolyte batteries employing the positive active materials can also be provided.

According to the constitutions of (4) to (6) above, non-aqueous electrolyte batteries can be provided which retain the high thermal stability characteristic of lithium-manganese oxides having a spinel structure, have a high energy density and excellent high-rate discharge performance, are inhibited from suffering self-discharge, and have excellent storage performance.

Namely, the present inventors made intensive investigations on the displacement of part of the cobalt in an $LiCoO_2$ crystal structure by elements other than cobalt for the purpose of improving various properties of the $LiCoO_2$ heretofore in use among positive active materials. As a result, it has been utterly surprisingly found that when the cobalt occupying the 3b sites in an $\alpha$-$NaFeO_2$ structure is displaced by manganese and nickel elements in an amount determined by a specific composition, then the resultant composite oxide has greatly improved high-rate discharge performance and is inhibited from undergoing excessive lithium ion extraction in high-temperature charge as compared with the $LiCoO_2$ which has not undergone the displacement.

Although the mechanism by which such as effect is produced is not entirely clear, the following hypotheses are possible. There is a possibility that the manganese and nickel elements might exert some influence on the whole $LiCoO_2$ crystal structure to accelerate lithium diffusion. There also is a possibility that the manganese and nickel elements might stabilize the whole $LiCoO_2$ crystal structure. Furthermore, there is a possibility that the manganese and nickel elements might exert some action locally on the surface of the $LiCoO_2$ crystals. Moreover, there is a possibility that the manganese and nickel elements might exert some influence on solid-phase reactions between lithium and cobalt which take place in a sintering step in active-material synthesis to thereby produce an optimal particle form. These hypotheses have not been investigated so far. However, even a small displacing-element amount results in remarkable improvements in battery performance and the advantages of the invention are surprising in this point.

For obtaining the advantages of the invention in a preferred manner, the constitutional ratio between manganese and nickel is a crucially important matter. Namely, the Mn/Ni element ratio in the invention is regulated so that the value of |b−c| (absolute value of the difference between the value of b and the value of c) is 0.05 or smaller, preferably smaller than 0.03, whereby advantages of the invention are produced remarkably. Namely, a positive active material having high high-rate discharge performance and a high discharge capacity is obtained. This active material further has excellent charge/discharge cycle characteristics. When |b−c| exceeds 0.05, this means an unstable structure. In case where c is too large, i.e., nickel is contained in excess, this does not considerably influence the charge/discharge capacity itself because an $LiNiO_2$ phase generates. In this case, however, thermal stability in the final stage of charge becomes considerably poor. In case where b is too large, i.e., manganese is contained in excess, an impurity phase which is not of the $\alpha$-$NaFeO_2$ type, such as $LiMn_2O_3$, is formed. Since this impurity phase undergoes no electrode reactions in a 4-V region, the formation thereof reduces the capacity of the active material. Furthermore, the presence of the impurity phase reduces the crystallinity of the composite oxide, resulting in a larger decrease in capacity. Consequently, the proportions of the constitutional nickel and manganese elements in the chemical composition are desirably in such a range that |b−c|≦0.05, preferably |b−c|<0.03.

In the case where battery performances such as, in particular, discharge capacity, charge/discharge performance, and the like are desired to be improved, it is preferred that 0<c−b≦0.05. This range is effective probably because impurities such as $Li_2MnO_3$ are diminished. Although there is a fear about a decrease in thermal stability during charge due to the increased nickel element proportion in this case, no problem arises as long as the proportion thereof is within the range specified in the invention. This is probably because the proportion of nickel in all 3b sites can be reduced.

The proportions of manganese and nickel elements in the 3b sites also are important. Namely, the sum of manganese and nickel in the (chemical composition formula 1) (hereinafter referred to also as Mn+Ni amount), i.e., the value of b+c, is regulated to a positive number of 0.4 or smaller, preferably 0.2 or smaller, whereby advantages of the invention are produced remarkably. An Mn+Ni amount of 0 is undesirable because this results in reduced high-rate discharge performance and in an increase in the amount of lithium ions excessively extracted during high-temperature charge. Furthermore, Mn+Ni amounts exceeding 0.4 are undesirable because the excessive extraction of lithium ions during high-temperature charge cannot be inhibited in this case also.

Consequently, it is desirable that manganese and/or nickel be present in the composite oxide. Namely, it is preferred that b>0 and/or c>0. In case where manganese is not present in the composite oxide (B) in a non-aqueous electrolyte battery, this battery tends to have poor thermal stability. In case where nickel is not present, the composite oxide has an unstable crystal structure and the battery tends to have poor charge/discharge cycle performance.

Furthermore, in case where the proportion of constituent cobalt element is too small in a non-aqueous electrolyte battery, the reduced proportion thereof results in reduced high-rate discharge performance. This composite oxide is hence unsuitable for use as a material to be mixed with the lithium-manganese oxide (A). Moreover, such a low cobalt proportion is undesirable because it results in an impaired initial charge/discharge efficiency and, hence, there is a fear that the battery may have a reduced energy density. In case where d=1, i.e., the composite oxide is a lithium-cobalt oxide, excessive lithium extraction occurs during charge in a high-temperature atmosphere of 40° C. or higher. In contrast, when d is in the range of 0.6≦d<1, preferably 0.8≦d<1, then lithium extraction in a high-temperature atmosphere is less apt to occur. This may be because the presence of nickel and manganese elements contained in the same amount has brought about some stability which contributes to the whole structure. Consequently, d is desirably in the range of 0.6≦d<1, preferably 0.8≦d<1.

It is therefore necessary to satisfy b+c+d=1 and 0.6≦d<1 for attaining high high-rate discharge performance and inhibiting a high-temperature charge capacity from increasing. The lower limit of the value of d is preferably 0.8, more preferably 0.83, most preferably 0.90. The upper limit of the value of d is more preferably 0.99, most preferably 0.95.

Moreover, in the (chemical composition formula 1), the value of a, which indicates the amount of lithium, is a positive number of 1.3 or smaller (preferably smaller than 1.3). As long as the value of a is within this range, performances of the invention are produced. Values of a larger than 1.3 are undesirable because the excess lithium forms lithium compounds, e.g., the carbonate, on the surface of the active material and this exerts adverse influences not only during electrode production but also on battery characteristics, in particular, charge/discharge cycle characteristics. As long as the value of a is 0<a≦1.3 in a non-aqueous electrolyte battery, the composite oxide (B) serves as an active material retaining satisfactory storage performance. Consequently, when a mixture of this composite oxide and the lithium-manganese oxide (A) is used as a positive electrode, an improvement in storage performance is expected.

BEST MODE FOR CARRYING OUT THE INVENTION

In synthesizing the positive active materials of the invention, production processes are not particularly limited as long as the 3a sites in an α-NaFeO$_2$ structure are occupied by lithium, the 3b sites therein are occupied by cobalt, manganese, and nickel, and the 6c sites therein are occupied by oxygen each in a proper amount. Practically, the positive active materials can be advantageously produced by griding/mixing a lithium compound, manganese compound, nickel compound, and cobalt compound and subjecting the mixture to a method for thermal decomposition/mixing, a method for precipitation reaction, or a method for hydrolysis. Of these, the method in which a composite precipitation compound of manganese, nickel, and cobalt (hereinafter referred to also as "Mn—Ni—Co mixture precursor") and a lithium compound are used as raw materials and are mixed/heat-treated is preferred from the standpoint of producing a homogeneous composite oxide.

The Mn—Ni—Co mixture precursor to be produced preferably is a compound in which the manganese, nickel, and cobalt have been evenly mixed together. Any production process satisfying this requirement may be used without particular limitations. However, since the crystal structure is required to be highly stable to lithium extraction/insertion in the element constitution ranges according to the invention, use may be made of "a coprecipitation process in which an acidic aqueous solution of manganese, nickel, and cobalt is precipitated with an aqueous alkali solution, e.g., an aqueous sodium hydroxide solution". By this method, a positive active material showing especially high battery performances can be produced. In this method, it is preferred to generate crystal growth nuclei under such conditions that the amount of ammonium ions in the reaction system is in excess of the amount of ions of these metals, i.e., manganese, nickel, and cobalt, because precursor particles which are exceedingly homogeneous and highly bulky can be produced. The absence of ammonium ions is undesirable because ions of those metals rapidly precipitate through acid-base reactions and this results in random crystal orientation to form a precipitate having a low bulk density. When ammonium ions are present, the rate of the precipitation reactions is reduced because precipitation occurs via metal-ammine complex formation reactions and, hence, a highly bulky precipitate of primary-particle crystals having satisfactory crystal orientation can be produced. The presence of ammonium ions is therefore preferred. It is also possible to regulate properties of the coprecipitation compound, such as particle shape, bulk density, and surface area, by selecting apparatus factors such as reactor shape and the kind of stirring blades and various factors including the period of precipitate residence in a reaction vessel, reaction vessel temperature, total ion amount, liquid pH, ammonium ion concentration, and concentration of an oxidation number regulator.

Examples of raw materials for the Mn—Ni—Co mixture precursor are as follows. Examples of manganese compounds include manganese oxide, manganese carbonate, manganese sulfate, manganese nitrate, and the like. Examples of nickel compounds include nickel hydroxide, nickel carbonate, nickel sulfate, nickel nitrate, and the like. Examples of cobalt compounds include cobalt sulfate, cobalt nitrate, and the like. Examples of ammonium sources include ammonium sulfate, aqueous ammonia, and the like.

The raw materials to be used for producing the Mn—Ni—Co mixture precursor may be in any form as long as they undergo a precipitation reaction with an aqueous alkali solution. However, it is preferred to use metal salts having high solubility. In this case, although manganese can have two or more oxidation numbers, it is preferred that manganese be incorporated in a bivalent state into crystals in precipitate formation. In case where manganese is oxidized in precipitate formation, water is apt to be incorporated into the crystals and this results in a possibility that an impurity phase might generate in a sintering step. Although examples of the impurity phase include Li$_2$MnO$_3$, this Li$_2$MnO$_3$ as an active material is electrically inactive at around 4 V and is causative of a decrease in capacity. For overcoming this problem, use is made of a method in which a reducing agent such as hydrazine is introduced into the reaction solution or the atmosphere in the reaction vessel is filled with inert gas to remove oxygen. Known production processes employing this technique are described in JP-A-11-317224, JP-A-2000-3706, JP-A-11-312519, and JP-A-11-307093. Incidentally, when a precipitate is formed in the presence of a hydroxide, the main precipitation products are in the form of hydroxide. However, there are cases where compounds of, e.g., manganese become an oxide form in the step of drying the precipitated precursor.

The Mn—Ni—Co mixture precursor may be produced by coating a cobalt compound with manganese and nickel compounds. Namely, a solution containing manganese and nickel is dropped into a suspension of a cobalt compound to thereby evenly deposit an Mn—Ni precipitate. The cobalt compound is not particularly limited as long as it has a low solubility. It is, however, preferred to use cobalt(II) oxide, cobalt(III) hydroxide oxide, dicobalt(III) monocobalt(II) tetroxide, cobalt(II) hydroxide, or the like. As stated above, it is necessary to fill the inside of the reaction system with a reducing atmosphere because manganese is used. The presence of ammonium ions is necessary for evenly growing crystals on the cobalt compound. Under some conditions, however, ammonium ions need not be present because a cobalt compound is already present. For producing the Mn—Ni—Co mixture precursor, the coprecipitation process is more preferred from the standpoint of causing the elements to be evenly present in the mixture precursor.

The composite oxide (B) in the invention can be advantageously produced by mixing the Mn—Ni—Co mixture precursor with a lithium compound and then heat-treating the mixture. As the lithium compound may be used lithium hydroxide or lithium carbonate. Thus, the composite oxide (B) can be advantageously produced.

The heat treatment may be conducted in an oxygen atmosphere at a temperature in the range of from 700° C. to 1,000° C., preferably from 700° C. to 900° C., whereby the target oxide can be advantageously produced. Temperatures for the heat treatment lower than 700° C. are undesirable because solid-phase reactions do not proceed. Heat treatment temperatures higher than 1,000° C. are undesirable because solid-phase reactions proceed excessively and, as a result, sintering proceeds exceedingly. Consequently, as long as the heat treatment temperature is in the range of preferably from 700 to 1,000° C., more preferably from 700 to 900° C., especially preferably from 750 to 800° C., high properties can be exhibited.

Furthermore, in synthesizing the lithium-manganese oxide (A) to be used in the invention, production processes are not particularly limited as long as the 8a sites and 16d sites in a spinel structure are occupied respectively by lithium and manganese each in a proper amount. Practically, the oxide (A) can be easily produced by the solid-phase reaction of manganese dioxide with a lithium compound. With respect to displacing elements which displace manganese sites, such as Mg, Al, Ti, V, Cr, Fe, Co, and Ni, they may be added during the solid-phase reaction. Thus, the target oxide can be advantageously produced.

Raw materials for the displacing elements may be in various forms such as, e.g., metal, oxide, salt, chelate, and organometal, and any of these forms may be used. This is because compounds in each of such various forms first take a metal oxide form upon heating and then undergo a solid-phase reaction with a manganese compound or lithium compound.

Conditions for the heat treatment for causing the solid-phase reaction to proceed include an oxygen atmosphere and a temperature of from 700° C. to 900° C., whereby the target oxide can be advantageously synthesized. Temperatures for the heat treatment lower than 700° C. are undesirable because the solid-phase reaction does not proceed. On the other hand, heat treatment temperatures higher than 900° C. are undesirable because the solid-phase reaction proceeds excessively and, as a result, sintering proceeds extremely. The more preferred range of the temperature is from 750° C. to 850° C. As long as the temperature is in this range, a lithium-manganese oxide (A) having high performance can be obtained.

The non-aqueous electrolyte batteries (hereinafter also referred to simply as "batteries") according to the invention have a positive electrode containing a positive active material of the invention, a negative electrode, and a non-aqueous electrolyte. In general, a separator is disposed between the positive electrode and the negative electrode.

In a large battery for use in electric motorcars or for power storage or the like, the positive electrode in each of the non-aqueous electrolyte batteries preferably is one containing both the lithium-manganese oxide (A) and the composite oxide (B), and especially preferably one containing the (A) and the (B) in a proportion (weight ratio) of from 5:95 to 90:10. When the proportion of (A) is 5% by weight or higher based on "(A)+(B)", the batteries can have improved thermal stability. When the proportion of (A) is 90% by weight or lower based on "(A)+(B)", the self discharge rate of the batteries can be diminished without fail and initial discharge capacity, high-rate discharge performance, and capacity recovery rate can be sufficiently obtained.

As the non-aqueous electrolyte can be employed ones use of which for lithium batteries and the like has been proposed. Examples of non-aqueous solvents for use in the non-aqueous electrolyte include any one of or a mixture of two or more of: cyclic carbonic esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran or derivatives thereof; ethers such as 1,3-dioxane, 1,4-dioxane, 1,2-dimethoxyethane, 1,4-dibutoxyethane, and methyldiglyme; nitriles such as acetonitrile and benzonitrile; dioxolane or derivatives thereof; ethylene sulfide, sulfolane, and sulfones or derivatives thereof; and the like. However, the solvents should not be construed as being limited to these examples.

Examples of electrolyte salts for use in the non-aqueous electrolyte include inorganic ionic salts containing one of lithium (Li), sodium (Na), and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN; organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate, and lithium dodecylbenzenesulfonate; and the like. These ionic compounds can be used alone or as a mixture of two or more thereof.

Furthermore, use of a mixture of $LiBF_4$ and a lithium salt having a perfluoroalkyl group, such as $LiN(C_2F_5SO_2)_2$, is more desirable because the electrolyte viscosity can be further reduced and, hence, low-temperature characteristics can be further enhanced, and because the mixture is effective in inhibiting self-discharge.

A salt which is molten at ordinary temperature may also be used.

The concentration of the electrolyte salt in the non-aqueous electrolyte is preferably from 0.1 mol/l to 5 mol/l, more preferably from 0.5 mol/l to 2.5 mol/l, from the standpoint of obtaining a non-aqueous electrolyte battery having high battery characteristics without fail.

As a negative-electrode material may be selected any one which is in a form able to deposite or dope lithium ions. Examples thereof include lithium metal, lithium alloys (lithium metal-containing alloys such as lithium-aluminum, lithium-lead, lithium-tin, lithium-aluminum-tin, lithium-gallium, and Wood's metal), lithium composite oxides (lithium-titanium), and silicon oxide, and further include alloys able to dope/undope lithium and carbonaceous materials (e.g., graphites, hard carbon, low-temperature-sintered carbon, and amorphous carbon). Of these, graphites have an operating potential very close to that of metallic lithium and can realize charge/discharge at a high operating voltage. Furthermore, when a lithium salt is employed as an electrolyte salt, graphites are effective in diminishing self-discharge and in reducing the irreversible capacity in charge/discharge. Graphites are hence preferred negative-electrode materials. For example, artificial graphite and natural graphite are preferred. In particular, graphite negative-electrode material particles whose surface has been modified with, e.g., amorphous carbon are desirable because gas generation therefrom during charge is little.

Results of examinations by X-ray diffractometry, etc. of graphites which can be advantageously used are shown below.

Lattice spacing ($d_{002}$): 0.333-0.350 nm
Crystallite size in a-axis direction, La: $\geq 20$ nm
Crystallite size in c-axis direction, Lc: $\geq 20$ nm
True density: 2.00-2.25 g/cm$^3$ It is also possible to modify a graphite by adding thereto a metal oxide, e.g., tin oxide or silicon oxide, phosphorus, boron, amorphous carbon, or the like. In particular, modifying the surface of a graphite by the method described above is desirable because this modification can inhibit electrolyte decomposition and thereby heighten battery characteristics. Furthermore, a combination of a graphite and either lithium metal or a lithium metal-containing alloy, such as lithium-aluminum, lithium-lead, lithium-tin, lithium-aluminum-tin, lithium-gallium, or Wood's metal, or the like can be used as a negative-electrode material. A graphite into which lithium has been inserted beforehand by electrochemical reduction can also be used as a negative-electrode material.

Incidentally, either of the above-described composite oxides according to the invention may be used in combination with any one of lithium-containing phosphoric acid salts, lithium-containing sulfuric acid salts, and the like or with a mixture of two or more of these. Examples of lithium-containing transition metal oxides include ones represented by the chemical composition formula $Li_xMX_2$ or $Li_xMN_yX_2$ (wherein M and N represent a metal in Groups I to VIII, and X represents a chalcogen such as oxygen or sulfur), such as, e.g., $Li_yCo_{1-x}M_xO_2$ and $Li_yMn_{2-x}M_xO_4$. [Examples of M include metals in Groups I to VIII (e.g., one or more elements selected from Li, Ca, Cr, Ni, Fe, and Co). In the lithium-containing transition metal oxides, the value of x, which indicates the displacement amount of the element of a different kind, may be any value up to one corresponding to the maximum displacement possible. Although such values are effective, x is preferably in the range of $0 \leq x \leq 1$ from the standpoint of discharge capacity. With respect to the value of y, which indicates lithium amount, the maximum amount in which lithium can be reversibly utilized is effective. However, y is preferably in the range of $0 \leq y \leq 2$ from the standpoint of discharge capacity.] However, the transition metal oxides should not be construed as being limited to these examples.

Furthermore, a mixture with other positive active materials may be used in the positive electrode. Examples of other positive active materials include compounds of a Group I metal, such as CuO, $Cu_2O$, $Ag_2O$, CuS, and $CuSO_4$, compounds of a Group IV metal, such as $TiS_2$, $SiO_2$, and SnO, compounds of a Group V metal, such as $V_2O_5$, $V_6O_{12}$, $VO_x$, $Nb_2O_5$, $Bi_2O_3$, and $Sb_2O_3$, compounds of a Group VI metal, such as $CrO_3$, $Cr_2O_3$, $MoO_3$, $MoS_2$, $WO_3$, and $SeO_2$, compounds of a Group VII metal, such as $MnO_2$ and $Mn_2O_3$, compounds of a Group VIII metal, such as $Fe_2O_3$, FeO, $Fe_3O_4$, $Ni_2O_3$, NiO, $CoO_3$, and CoO, metal compounds such as, e.g., lithium-cobalt composite oxides and lithium-manganese composite oxides, conductive polymeric compounds such as disulfides, polypyrrole, polyaniline, poly-p-phenylene, polyacetylene, and polyacene materials, carbonaceous materials of the pseudo-graphite structures and the like. However, the optionally usable positive active materials should not be construed as being limited to these examples.

A powder of the positive active material and a powder of the negative-electrode material desirably have an average particle size of 100 μm or smaller. In particular, it is desirable that the average particle size of the powder of the positive active material be 10 αm or smaller for the purpose of improving the high-output characteristics of the non-aqueous electrolyte battery. A grinder and a classifier are used for obtaining a powder having a given size. For example, use is made of a mortar, ball mill, sand mill, oscillating ball mill, planetary ball mill, jet mill, counter jet mill, or cyclone type jet mill and sieves or the like. Grinding may be conducted by wet grinding in which water or an organic solvent, e.g., hexane, coexists. Methods of classification are not particularly limited, and sieves, an air classifier, or the like is used in each of dry and wet processes according to need.

Although the positive active material and negative-electrode material which are major constituent components of the positive electrode and negative electrode were described above in detail, the positive electrode and negative electrode may contain a conductive material, binder, thickener, filler, and the like as other components besides the major constituent components.

The conductive material is not limited as long as it is an electron-conductive material not adversely influencing battery performance. Usually, however, conductive materials such as natural graphite (e.g., flake graphite, flaky graphite, or soil-like graphite), artificial graphite, carbon black, acetylene black, Ketjen Black, carbon whiskers, carbon fibers, metal (e.g., copper, nickel, aluminum, silver, or gold) powders, metal fibers, and conductive ceramic materials can be incorporated alone or as a mixture thereof.

A preferred conductive material of these is acetylene black from the standpoints of electron-conductive properties and applicability. The amount of the conductive material to be added is preferably from 0.1% by weight to 50% by weight, especially preferably from 0.5% by weight to 30% by weight, based on the total weight of the positive electrode or negative electrode. It is especially desirable to use acetylene black which has been ground to ultrafine particles of from 0.1 to 0.5 μm, because use thereof is effective in reducing the amount of carbon required. For mixing those ingredients, physical mixing is conducted. Homogeneous mixing is ideal. For this mixing, a powder mixer such as a V-type mixer, S-type mixer, mortar mill, ball mill, or planetary mill can be used in a dry or wet mixing process.

As the binder can usually be used one of or a mixture of two or more of thermoplastic resins such as polytetrafluoroethylene (PTFE), poly(vinylidene fluoride) (PVDF), polyethylene, and polypropylene and polymers having rubber elasticity, such as ethylene/propylene/diene terpolymers (EPDM), sulfonated EPDM, styrene/butadiene rubbers (SBR), and fluororubbers. The amount of the binder to be added is preferably from 1 to 50% by weight, especially preferably from 2 to 30% by weight, based on the total weight of the positive electrode or negative electrode.

As the thickener can usually be used one of or a mixture of two or more of polysaccharides such as carboxymethyl cellulose and methyl cellulose and the like. In the case of thickeners having functional groups reactive with lithium, such as polysaccharides, it is desired to deactivate the functional groups beforehand by, e.g., methylation. The amount of the thickener to be added is preferably from 0.5 to 10% by weight, especially preferably from 1 to 2% by weight, based on the total weight of the positive electrode or negative electrode.

As the filler may be used any material which does not adversely influence battery performance. Usually, use is made of an olefin polymer such as polypropylene or polyethylene, amorphous silica, alumina, zeolite, glass, carbon, etc. The amount of the filler to be added is preferably up to 30% by weight based on the total weight of the positive electrode or negative electrode.

The positive electrode and negative electrode are produced preferably by kneading the main constituent ingredient (i.e., a positive active material in the case of the positive electrode or a negative-electrode material in the case of the negative electrode) together with other materials to prepare a composite, mixing this composite with an organic solvent, e.g., N-methylpyrrolidone or toluene, subsequently applying or press-bonding the resultant liquid mixture to the current collector which will be described later, and then heat-treating the mixture at a temperature of about from 50° C. to 250° C. for about 2 hours. In the application, it is desired to apply the liquid mixture, for example, by roller coating using an applicator roll, screen coating, doctor blade coating, spin coating, or coating with a bar coater or the like in any desired thickness and any desired shape. However, methods of application should not be construed as being limited to these.

As the current collector may be used any electron conductor which does not exert an adverse influence in the battery fabricated. For example, the current collector for the positive electrode can be aluminum, titanium, stainless steel, nickel, sintered carbon, a conductive polymer, conductive glass, or the like. Besides these, use can be made, as the positive-electrode current collector, of a material obtained by treating the surface of aluminum, copper, or the like with carbon, nickel, titanium, silver, or the like for the purpose of improving adhesiveness, conductivity, and oxidation resistance. The current collector for the negative electrode can be copper, nickel, iron, stainless steel, titanium, aluminum, sintered carbon, a conductive polymer, conductive glass, Al—Cd alloy, or the like. Besides these, use can be made, as the negative-electrode current collector, of a material obtained by treating the surface of copper or the like with carbon, nickel, titanium, silver, or the like for the purpose of improving adhesiveness, conductivity, and reduction resistance. These materials can be subjected to a surface oxidation treatment.

With respect to the shape of the current collector, use is made of a foil form or a film, sheet, net, punched or expanded, lath, porous, or foamed form. A structure made up of fibers is also usable. Although the thickness thereof is not particularly limited, collectors having a thickness of from 1 to 500 μm are used. Of these current collectors, a preferred collector for the positive electrode is an aluminum foil, which has excellent oxidation resistance. Preferred current collectors for the negative electrode are a copper foil, nickel foil, and iron foil, which are excellent in reduction resistance and electrical conductivity and are inexpensive, and an alloy foil containing part of these. Furthermore, these foils preferably are ones in which the rough-surface side has a surface roughness Ra of 0.2 μm or more. This surface roughness enables the current collector to be in highly close contact with the positive active material or negative-electrode material. It is therefore preferred to use an electrolytic foil, which has such a rough surface. Most preferred is an electrolytic foil which has undergone a "hana" surface treatment. Furthermore, in the case where these foils are to be coated on both sides, it is desirable that the both sides have the same or almost the same surface roughness.

The separator for non-aqueous electrolyte batteries preferably is one of or a combination of two or more of porous films, nonwoven fabrics, and the like which show excellent high-rate discharge characteristics. Examples of the material constituting the separator for non-aqueous electrolyte batteries include polyolefin resins represented by polyethylene and polypropylene, polyester resins represented by poly(ethylene terephthalate) and poly(butylene terephthalate), poly(vinylidene fluoride), vinylidene fluoride/hexafluoropropylene copolymers, vinylidene fluoride/perfluorovinyl ether copolymers, vinylidene fluoride/tetrafluoroethylene copolymers, vinylidene fluoride/trifluoroethylene copolymers, vinylidene fluoride/fluoroethylene copolymers, vinylidene fluoride/hexafluoroacetone copolymers, vinylidene fluoride/ethylene copolymers, vinylidene fluoride/propylene copolymers, vinylidene fluoride/trifluoropropylene copolymers, vinylidene fluoride/tetrafluoroethylene/hexafluoropropylene copolymers, and vinylidene fluoride/ethylene/tetrafluoroethylene copolymers.

The porosity of the separator for non-aqueous electrolyte batteries is preferably 98% by volume or lower from the standpoint of strength. The porosity thereof is preferably 20% by volume or higher from the standpoint of charge/discharge characteristics.

As the separator for non-aqueous electrolyte batteries may be used a polymer gel constituted of a polymer of, e.g., acrylonitrile, ethylene oxide, propylene oxide, methyl methacrylate, vinyl acetate, vinylpyrrolidone, poly(vinylidene fluoride), or the like and an electrolyte.

Use of a non-aqueous electrolyte in such a gel form in the invention is preferred in that it has the liquid electrolyte leakage preventive effect.

Furthermore, a separator for non-aqueous electrolyte batteries which comprises a combination of a porous film, non-woven fabric, or the like such as that described above and a polymer gel is desirable because use of this separator improves electrolyte retention. Namely, the surface of a microporous polyethylene film and the walls of the micropores are coated in a thickness of up to several micrometers with a polymer having affinity for solvents and an electrolyte is caused to held in the micropores of the coated film, whereby the polymer having affinity for solvents gels.

Examples of the polymer having affinity for solvents include poly(vinylidene fluoride) and polymers formed by the crosslinking of an acrylate monomer having an ethylene oxide group or ester group, epoxy monomer, monomer having isocyanate groups, or the like. These monomers can be crosslinked with heating or ultraviolet (UV) in the presence of a free-radical initiator or crosslinked with actinic rays, such as electron beams (EB), or the like.

For the purpose of regulating strength or properties, a property regulator can be incorporated into the polymer having affinity for solvents in such an amount as not to inhibit the formation of a crosslinked structure. Examples of the property regulator include inorganic fillers {metal oxides such as silicon oxide, titanium oxide, aluminum oxide, magnesium oxide, zirconium oxide, zinc oxide, and iron oxide and metal carbonates such as calcium carbonate and magnesium carbonate} and polymers {poly(vinylidene fluoride), vinylidene fluoride/hexafluoropropylene copolymers, polyacrylonitrile, poly(methyl methacrylate), and the like}. The amount of the property regulator to be added is generally up to 50% by weight, preferably up to 20% by weight, based on the crosslinkable monomer.

Examples of the acrylate monomer include unsaturated monomers having a functionality of 2 or higher. Specific examples thereof include difunctional (meth)acrylates {ethylene glycol di(meth)acrylate, propylene glycol di(meth)acrylate, adipic acid dineopentyl glycol ester di(meth)acrylate, polyethylene glycol di(meth)acrylates having a degree of polymerization of 2 or higher, polypropylene glycol di(meth)acrylates having a degree of polymerization of 2 or higher, polyoxyethylene/polyoxypropylene copolymer di(meth)acrylates, butanediol di(meth)acrylate, hexamethylene glycol di(meth)acrylate, and the like}, trifunctional (meth)acrylates {trimethylolpropane tri(meth)acrylate, glycerol tri(meth)acrylate, tri(meth)acrylates of ethylene oxide adducts of glycerol, tri(meth)acrylates of propylene oxide adducts of glycerol, tri(meth)acrylates of ethylene oxide/propylene oxide adducts of glycerol, and the like}, and (meth)acrylates having a functionality of 4 or higher {(pentaerythritol tetra(meth)acrylate, diglycerol hexa(meth)acrylate, and the like}. These monomers can be used alone or in combination.

A monofunctional monomer may be added to the acrylate monomer for the purpose of property regulation, etc. Examples of the monofunctional monomer include unsaturated carboxylic acids {acrylic acid, methacrylic acid, crotonic acid, cinnamic acid, vinylbenzoic acid, maleic acid, fumaric acid, itaconic acid, citraconic acid, mesaconic acid, methylmalonic acid, aconitic acid, and the like}; unsaturated sulfonic acids {styrenesulfonic acid, acrylamido-2-methylpropanesulfonic acid, and the like} or salts of these (lithium salts, sodium salts, potassium salts, ammonium salts, tetraalkylammonium salts, and the like); those unsaturated carboxylic acids partly esterified with a $C_1$-$C_{18}$ aliphatic or alicyclic alcohol, alkylene ($C_2$-$C_4$) glycol, polyalkylene ($C_2$-$C_4$) glycol, or the like (methyl maleate, monohydroxyethyl maleate, and the like) or partly amidated with ammonia or a primary or secondary amine (maleic acid monoamide, N-methylmaleic acid monoamide, N,N-diethylmaleic acid monoamide, and the like); (meth)acrylic esters [esters of (meth) acrylic acid with a $C_1$-$C_{18}$ aliphatic (e.g., methyl, ethyl, propyl, butyl, 2-ethylhexyl, or stearyl) alcohol; and esters of (meth)acrylic acid with an alkylene ($C_2$-$C_4$) glycol (ethylene glycol, propylene glycol, 1,4-butanediol, or the like) or with a polyalkylene ($C_2$-$C_4$) glycol (polyethylene glycol or polypropylene glycol)]; (meth)acrylamide or N-substituted (meth)acrylamides [(meth)acrylamide, N-methyl(meth)acrylamide, N-methylol(meth)acrylamide, and the like]; vinyl esters or allyl esters [vinyl acetate, allyl acetate, and the like]; vinyl ethers or allyl ethers [butyl vinyl ether, dodecyl allyl ether, and the like]; unsaturated nitrile compounds [(meth)acrylonitrile, crotononitrile, and the like]; unsaturated alcohols [(meth)allyl alcohol and the like]; unsaturated amines [(meth)allylamine, dimethylaminoethyl (meth)acrylate, diethylaminoethyl (meth)acrylate, and the like]; heterocycle-containing monomers [N-vinylpyrrolidone, vinylpyridine, and the like]; olefinic aliphatic hydrocarbons [ethylene, propylene, butylene, isobutylene, pentene, ($C_6$-$C_{50}$) α-olefins, and the like]; olefinic alicyclic hydrocarbons [cyclopentene, cyclohexene, cycloheptene, norbornene, and the like]; olefinic aromatic hydrocarbons [styrene, α-methylstyrene, stilbene, and the like]; unsaturated imides [maleimide and the like]; and halogen-containing monomers [vinyl chloride, vinylidene chloride, vinylidene fluoride, hexafluoropropylene, and the like].

Examples of the epoxy monomer include glycidyl ethers {bisphenol A diglycidyl ether, bisphenol F diglycidyl ether, brominated bisphenol A diglycidyl ether, phenol-novolac glycidyl ether, cresol-novolac glycidyl ether, and the like}, glycidyl esters {hexahydrophthalic acid glycidyl ester, dimer acid glycidyl esters, and the like}, glycidylamines {triglycidyl isocyanurate, tetraglycidyldiaminophenylmethane, and the like}, linear aliphatic epoxides {epoxidized polybutadiene, epoxidized soybean oil, and the like}, and alicyclic epoxides {3,4-epoxy-6-methylcyclohexylmethylcarboxylate, 3,4-epoxycyclo-hexylmethylcarboxylate, and the like}. These epoxy resins can be used alone or after having been cured by addition of a hardener thereto.

Examples of the hardener include aliphatic polyamines {diethylenetriamine, triethylenetetramine, 3,9-(3-aminopropyl)-2,4,8,10-tetraoxaspiro[5,5]undecane, and the like}, aromatic polyamines {m-xylenediamine, diaminophenylmethane, and the like}, polyamides {dimer acid polyamides and the like}, acid anhydrides {phthalic anhydride, tetrahydromethylphthalic anhydride, hexahydrophthalic anhydride, trimellitic anhydride, and methylnadic anhydride}, phenol compounds {phenolic novolacs and the like}, polymercaptans {polysulfides and the like}, tertiary amines {tris(dimethylaminomethyl)phenol, 2-ethyl-4-methylimidazole, and the like}, and Lewis acid complexes {boron trifluoride/ethylamine complex and the like}.

Examples of the monomer having isocyanate groups include toluene diisocyanate, diphenylmethane diisocyanate, 1,6-hexamethylene diisocyanate, 2,4,4-trimethyl-hexamethylene diisocyanate, p-phenylene diisocyanate, 4,4'-dicyclohexylmethane diisocyanate, 3,3'-dimethyldiphenyl 4,4'-diisocyanate, dianisidine diisocyanate, m-xylene diisocyanate, trimethylxylene diisocyanate, isophorone diisocyanate, 1,5-naphthalene diisocyanate, trans-1,4-cyclohexyl diisocyanate, and lysine diisocyanate.

In crosslinking the monomer having isocyanate groups, a compound having active hydrogen may also be used. Examples of this compound include polyols and polyamines [difunctional compounds {water, ethylene glycol, propylene glycol, diethylene glycol, dipropylene glycol, and the like}, trifunctional compounds {glycerol, trimethylol-propane, 1,2,6-hexanetriol, triethanolamine, and the like}, tetrafunctional compounds {pentaerythritol, ethylenediamine, tolylenediamine, diphenylmethanediamine, tetramethylol-cyclohexane, methylglucosides, and the like}, pentafunctional compounds {2,2,6,6-tetrakis-(hydroxymethyl)cyclohexanol, diethylenetriamine, and the like}, hexafunctional compounds {sorbitol, mannitol, dulcitol, and the like}, and octafunctional compounds {sucrose and the like})], polyether polyols {propylene oxide and/or ethylene oxide adducts of the polyols or polyamines mentioned above}, and polyester polyols [condensates of the aforementioned polyols with a polybasic acid {adipic acid, o-, m-, or p-phthalic acid, succinic acid, azelaic acid, sebacic acid, or ricinoleic acid}, polycaprolactone polyols {poly-ε-caprolactone and the like}, polycondensates of hydroxycarboxylic acids, and the like].

A catalyst may also be used in conducting the crosslinking reaction. Examples of the catalyst include organotin compounds, trialkylphosphines, amines [monoamines {N,N-dimethylcyclohexylamine, triethylamine, and the like}, cyclic monoamines {pyridine, N-methylmorpholine, and the like}, diamines {N,N,N',N'-tetramethylethylenediamine, N,N,N',N'-tetramethyl-1,3-butanediamine, and the like}, triamines {N,N,N',N'-pentamethyldiethylenetriamine and the like}, hexamines {N,N,N',N'-tetra(3-dimethylaminopropyl)-methanediamine and the like}, cyclic polyamines {diazabicyclooctane (DABCO), N,N'-dimethylpiperazine, 1,2-dimethylimidazole, 1,8-diazabicyclo(5,4,0)undecene-7 (DBU), and the like}, and salts of these.

A non-aqueous electrolyte secondary battery according to the invention is produced preferably by a method which comprises superposing a separator for non-aqueous electrolyte batteries, a positive electrode, and a negative electrode, infiltrating an electrolyte thereinto, for example, before or after the superposition, and finally sealing the case with a facing body. In the case of a non-aqueous electrolyte battery employing a wound power generating element comprising a positive electrode and a negative electrode which have been stacked on each other through a separator for non-aqueous electrolyte batteries, it is preferred that an electrolyte be infiltrated into the power generating element before and after the winding. Although the infiltration may be conducted at ordinary pressure, the vacuum impregnation method or the pressure impregnation method can be used.

Examples of the material of the facing body include nickel-plated iron, stainless steel, aluminum, and metal/resin laminate films. For example, a metal/resin laminate film having a constitution comprising resin films and a metal foil sandwiched therebetween is preferred. Examples of the metal foil are not particularly limited as long as they are foils of aluminum, iron, nickel, copper, stainless steel, titanium, gold, silver, or the like which are free from pinholes. However, aluminum foils are preferred because they are lightweight and inexpensive. Preferred for use as the resin film to be disposed on the outer side in the battery is a resin film having excellent piercing strength, such as a poly(ethylene terephthalate) film or nylon film. Preferred as the resin film to be disposed on the inner side in the battery is a film which is fusion-bondable and has solvent resistance, such as a polyethylene film or nylon film.

The constitution of the non-aqueous electrolyte battery (e.g., lithium secondary battery or the like) is not particularly limited. Examples thereof include a coin battery and button battery which each have a positive electrode, negative electrode, and separator of a single-layer or multilayer structure, and further include a cylindrical battery, prismatic battery, and flat type battery which each have a positive electrode, negative electrode, and roll-form separator.

Figure 1:
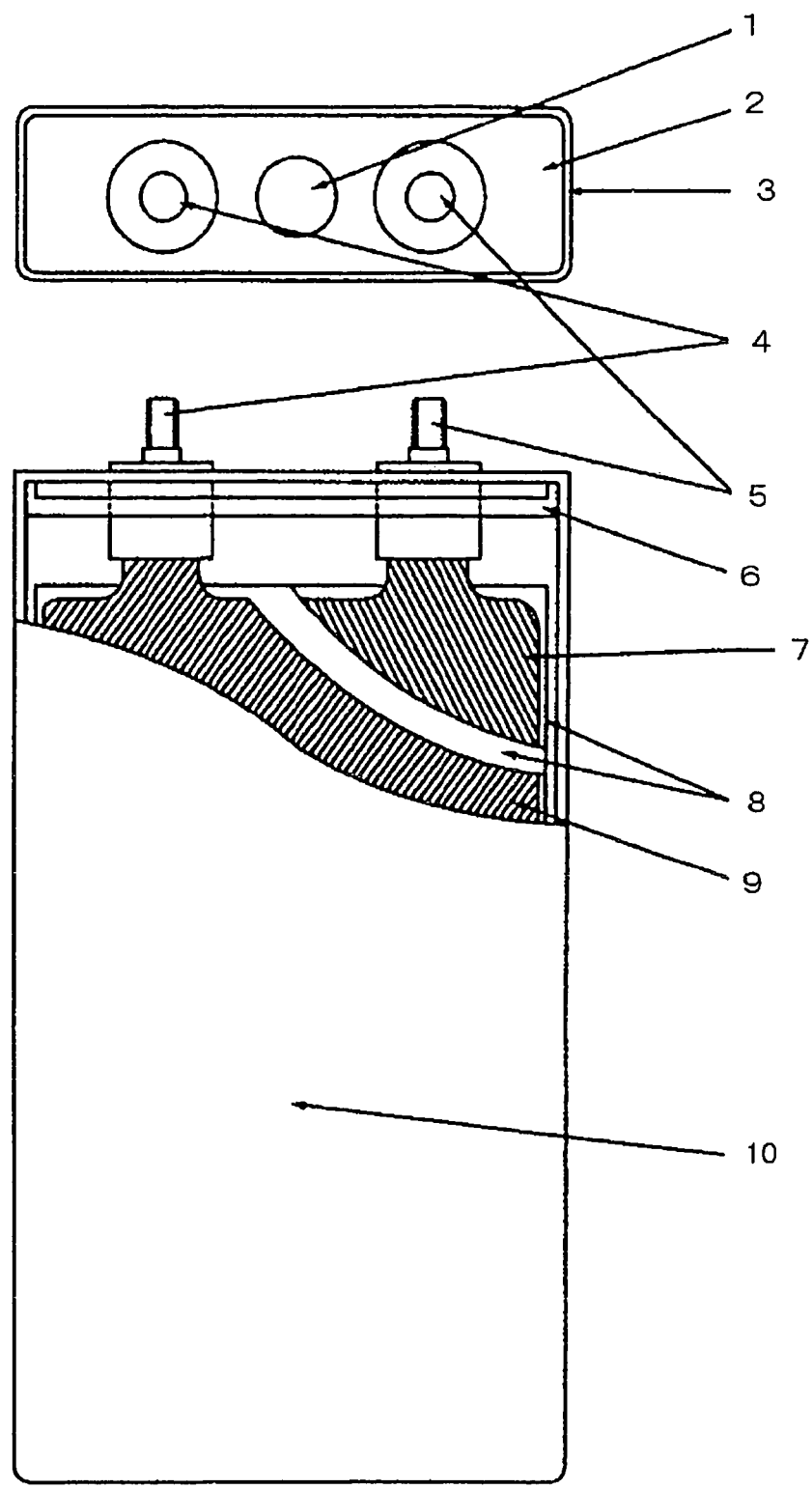
FIG. 1 is a sectional view of the batteries of Examples 1 to 8 and Comparative Examples 1 to 4.

In the figures, 1 denotes a safety vent, 2 a cap, 3 a laser-welded part, 4 a negative terminal, 5 a positive terminal, 6 a gasket, 7 a positive electrode plate, 8 a separator, 9 a negative electrode plate, 10 a battery case, 14 an electrode group, 15 a facing body, 16 a positive terminal, and 17 a negative terminal.

EXAMPLES

The invention will be further explained below by means of Examples and Comparative Examples, but the invention should not be construed as being limited to these Examples. The test methods described and the positive electrodes, negative electrodes, electrolytes, separators, shapes, etc. of the batteries to be fabricated are not particularly limited.

Example 1

Mn—Ni Coating Technique

Into a closed type reaction vessel having a capacity of 1 l were introduced 500 ml of water, 25% aqueous ammonia (1 g), and 100 g of cobalt hydroxide. The pH of the resultant solution was adjusted to 11.0±0.1 with 3% aqueous sodium hydroxide solution. The temperature of the solution in the reaction vessel was kept at 50° C. with an external heater. Argon gas having a purity of 99.9% was bubbled into the reaction solution to remove dissolved oxygen. An anchor type stirrer was used to stir the solution at a rotational speed of 800 rpm. A hundred milliliters of an aqueous solution containing, dissolved therein, manganese sulfate pentahydrate (0.65 g), nickel sulfate hexahydrate (0.71 g), and hydrazine monohydrate (0.01 g) was prepared as a metal source solution. This solution was continuously dropped into the reaction vessel at a flow rate of 2.0 ml/min. Simultaneously with this, 5% ammonia solution was dropped thereinto at a flow rate of 0.6 ml/min and mixed. A 32% aqueous solution of sodium hydroxide was intermittently introduced into the reaction vessel so that the pH of the reaction solution was kept at 11.0±0.1 throughout the dropping. Furthermore, a heater was intermittently operated so that the temperature of the solution in the reaction vessel was kept at 50° C. The mixture slurry obtained was filtered and water-washed repeatedly to remove unnecessary alkali ingredients and was then dried at 80° C. overnight.

The powder obtained was sieved to recover particles smaller than 75 μm. A lithium hydroxide monohydrate powder was weighed out so that Li/(Ni+Mn+Co)=1.0, and mixed with the particles by means of a planetary kneader. This mixture was charged into a pot made of alumina. Using an electric furnace, the mixture charged was, in a dry air stream, heated to 850° C. at a heating rate of 100° C./hr, held at the temperature of 850° C., for 15 hours, subsequently cooled to 200° C. at a cooling rate of 100° C./hr, and then allowed to cool. The powder obtained was sieved to obtain a powder of smaller than 75 μm.

As a result of examination by X-ray diffractometry, the powder obtained was found to have a single-phase structure belonging to the space group R3-m. As a result of compositional analysis by plasma emission spectrometry (hereinafter also referred to simply as "ICP"), the composition was ascertained to be $LiMn_{0.005}Ni_{0.0005}Co_{0.99}O_2$.

Example 2

Mn—Ni Coating Technique

A powder was obtained in the same manner as in Example 1, except that 25% aqueous ammonia (2 g) was used in place of the 25% aqueous ammonia (1 g) and that 100 ml of an aqueous solution containing, dissolved therein, manganese sulfate pentahydrate (1.3 g), nickel sulfate hexahydrate (1.41 g), and hydrazine monohydrate (0.01 g) was used as a metal source solution.

As a result of examination by X-ray diffractometry, the powder obtained was found to have a single-phase structure belonging to the space group R3-m. As a result of ICP, the composition was ascertained to be $LiMn_{0.01}Ni_{0.01}Co_{0.98}O_2$.

Example 3

Mn—Ni Coating Technique

A powder was obtained in the same manner as in Example 1, except that 25% aqueous ammonia (5 g) was used in place of the 25% aqueous ammonia (1 g) and that 100 ml of an aqueous solution containing, dissolved therein, manganese sulfate pentahydrate (3.24 g), nickel sulfate hexahydrate (3.53 g), and hydrazine monohydrate (0.02 g) was used as a metal source solution.

As a result of examination by X-ray diffractometry, the powder obtained was found to have a single-phase structure belonging to the space group R3-m. As a result of ICP, the composition was ascertained to be $LiMn_{0.025}Ni_{0.025}Co_{0.95}O_2$.

Example 4

Mn—Ni Coating Technique

A powder was obtained in the same manner as in Example 1, except that 25% aqueous ammonia (10 g) was used in place of the 25% aqueous ammonia (1 g) and that 100 ml of an aqueous solution containing, dissolved therein, manganese sulfate pentahydrate (6.48 g), nickel sulfate hexahydrate (7.07 g), and hydrazine monohydrate (0.05 g) was used as a metal source solution.

As a result of examination by X-ray diffractometry, the powder obtained was found to have a single-phase structure belonging to the space group R3-m. As a result of ICP, the composition was ascertained to be $LiMn_{0.05}Ni_{0.05}Co_{0.90}O_2$.

Example 5

Coprecipitation Process

Into a closed type reaction vessel equal in shape to but different in size from the reaction vessel used in Example 1 was introduced 3.5 l of water. Thereto was added 32% aqueous sodium hydroxide solution so as to result in a pH of 11.6±0.1. A stirrer having paddle type stirring blades was used to stir the solution at a rotational speed of 1,200 rpm and the temperature of the solution in the reaction vessel was kept at 50° C. with an external heater. Argon gas was bubbled into the solution in the reaction vessel to remove dissolved oxygen from the solution. A starting-material solution containing, dissolved therein, manganese sulfate pentahydrate (0.147 mol/l), nickel sulfate hexahydrate (0.147 mol/l), cobalt sulfate heptahydrate (1.464 mol/l), and hydrazine monohydrate (0.0101 mol/l) was prepared. This starting-material solution was continuously dropped into the reaction vessel at a flow rate of 3.17 ml/min. Simultaneously with this, 12 mol/l ammonia solution was dropped thereinto at a flow rate of 0.22 ml/min and mixed. A 32% aqueous solution of sodium hydroxide was intermittently introduced into the reaction vessel so that the pH of the solution in the reaction vessel was kept constant at 11.4±0.1. Furthermore, a heater was intermittently operated so that the temperature of the solution in the reaction vessel was kept constant at 50° C. Argon gas was directly bubbled into the liquid so that the atmosphere in the reaction vessel became a reducing atmosphere. Moreover, a flow pump was used to discharge a slurry from the system so that the liquid amount was always kept constant at 3.5 l. After 60 hours had passed since the reaction initiation and before 5 hours passed thereafter, a slurry of an Ni—Mn—Co composite oxide as a crystallization reaction product was taken out. The slurry obtained was washed with water, filtered, and dried at 80° C. overnight to obtain a dry powder of an Ni—Mn—Co coprecipitated precursor.

The Ni—Mn—Co coprecipitated precursor powder obtained was sieved to recover particles smaller than 75 μm. A lithium hydroxide monohydrate powder was weighed out so that Li/(Ni+Mn+Co)=1.0, and mixed with the particles by means of a planetary kneader. This mixture was charged into a pot made of alumina. Using an electric furnace, the mixture charged was, in a dry air stream, heated to 850° C. at a heating rate of 100° C./hr, held at the temperature of 850° C. for 15 hours, subsequently cooled to 200° C. at a cooling rate of 100° C./hr, and then allowed to cool. The powder obtained was sieved to obtain a powder consisting of particles of 75 μm or smaller.

As a result of examination by X-ray diffractometry, the powder obtained was found to have a single-phase structure belonging to the space group R3-m. As a result of ICP, the composition was ascertained to be $LiMn_{0.0835}Ni_{0.0835}Co_{0.833}O_2$. This powder had a BET surface area of 0.8 m²/g.

Comparative Example 1

Tricobalt tetraoxide and lithium carbonate were weighed out so as to result in an element ratio of 1:1, and were mixed together by means of a planetary kneader. This mixture was charged into a pot made of alumina. Using an electric furnace, the mixture charged was, in a dry air stream, heated to 850° C. at 100° C./hr, held at 850° C. for 15 hours, cooled to 200° C. at 100° C./hr, and then allowed to cool. The powder obtained was sieved to obtain a powder consisting of particles of 75 μm or smaller.

As a result of examination by X-ray diffractometry, the powder obtained was found to have a single-phase structure belonging to the space group R3-m. As a result of ICP, the composition was ascertained to be $LiCoO_2$.

Example 6

A powder was obtained in the same manner as in Example 1, except that 25% aqueous ammonia (20 g) was used in place of the 25% aqueous ammonia (1 g) and that 100 ml of an aqueous solution containing, dissolved therein, manganese sulfate pentahydrate (21.4 g), nickel sulfate hexahydrate (23.3 g), and hydrazine monohydrate (0.2 g) was used as a metal source solution.

As a result of examination by X-ray diffractometry, the powder obtained was found to have a single-phase structure belonging to the space group R3-m. As a result of ICP, the composition was ascertained to be $LiMn_{0.165}Ni_{0.165}Co_{0.67}O_2$.

Example 7

A powder was obtained in the same manner as in Example 1, except that 25% aqueous ammonia (5 g) was used in place of the 25% aqueous ammonia (1 g) and that 100 ml of an aqueous solution containing, dissolved therein, manganese sulfate pentahydrate (3.89 g), nickel sulfate hexahydrate (2.83 g), and hydrazine monohydrate (0.02 g) was used as a metal source solution.

As a result of examination by X-ray diffractometry, the powder obtained was found to have a single-phase structure belonging to the space group R3-m. As a result of ICP, the composition was ascertained to be $LiMn_{0.04}Ni_{0.01}Co_{0.95}O_2$.

Example 8

A powder was obtained in the same manner as in Example 1, except that 25% aqueous ammonia (5 g) was used in place of the 25% aqueous ammonia (1 g) and that 100 ml of an aqueous solution containing, dissolved therein, manganese sulfate pentahydrate (2.59 g), nickel sulfate hexahydrate (4.24 g), and hydrazine monohydrate (0.02 g) was used as a metal source solution.

As a result of examination by X-ray diffractometry, the powder obtained was found to have a single-phase structure belonging to the space group R3-m. As a result of ICP, the composition was ascertained to be $LiMn_{0.01}Ni_{0.04}Co_{0.95}O_2$.

Comparative Example 2

The same procedure as in Example 5 was conducted, except that a starting-material solution containing, dissolved therein, manganese sulfate pentahydrate (0.440 mol/l), nickel sulfate hexahydrate (0.440 mol/l), cobalt sulfate heptahydrate (0.879 mol/l), and hydrazine monohydrate (0.0101 mol/l) was prepared and used. Thus, a powder having the composition $LiMn_{0.25}Ni_{0.25}Co_{0.50}O_2$ was obtained.

Comparative Example 3

The same procedure as in Example 5 was conducted, except that a starting-material solution containing, dissolved therein, manganese sulfate pentahydrate (0.229 mol/l), nickel sulfate hexahydrate (0.123 mol/l), cobalt sulfate heptahydrate (1.406 mol/l), and hydrazine monohydrate (0.0101 mol/l) was prepared and used. Thus, a powder having the composition $LiMn_{0.13}Ni_{0.07}Co_{0.80}O_2$ was obtained.

Comparative Example 4

The same procedure as in Example 5 was conducted, except that a starting-material solution containing, dissolved therein, manganese sulfate pentahydrate (0.123 mol/l), nickel sulfate hexahydrate (0.229 mol/l), cobalt sulfate heptahydrate (1.406 mol/l), and hydrazine monohydrate (0.0101 mol/l)

was prepared and used. Thus, a powder having the composition $LiMn_{0.07}Ni_{0.13}Co_{0.80}O_2$ was obtained.

Production of Non-Aqueous Electrolyte Batteries

Each of the powders obtained in Examples 1 to 8 and Comparative Examples 1 to 4 given above was used as a positive active material to produce a non-aqueous electrolyte battery shown in FIG. 1 by the following procedure. Thus, batteries of Examples 1 to 8 and batteries of Comparative Examples 1 to 4 were obtained using the respective powders.

The positive active material, acetylene black, and poly (vinylidene fluoride) (PVdF) were mixed together in a ratio of 88:6:6 by weight. This poly(vinylidene fluoride) was used in the form of an N-methyl-2-pyrrolidone solution, and the amount thereof was converted to the weight on a solid basis. Thereto was further added N-methyl-2-pyrrolidone (NMP). This mixture was sufficiently kneaded to obtain a positive-electrode paste. The positive-electrode paste was applied to each side of an aluminum foil current collector having a thickness of 20 μm and dried. Thereafter, the coated current collector was pressed to produce a positive-electrode sheet. The positive-electrode sheet was cut into a rectangular shape and an aluminum lead was attached to an end thereof. Thus, a positive electrode plate 7 was produced.

Artificial graphite (average particle diameter, 6 μm; lattice spacing as determined by X-ray diffractometry ($d_{002}$), 0.337 nm; crystallite size in c-axis direction (Lc), 55 nm) as negative-electrode material was mixed with poly(vinylidene fluoride) (PVdF) in a ratio of 95:5 by weight. This poly(vinylidene fluoride) was used in the form of an N-methyl-2-pyrrolidone solution, and the amount thereof was converted to the weight on a solid basis. Thereto was further added N-methyl-2-pyrrolidone (NMP). This mixture was sufficiently kneaded to obtain a negative-electrode paste. The negative-electrode paste was applied to each side of an electrolytic copper foil having a thickness of 12 μm and dried. Thereafter, the coated copper foil was pressed to produce a negative-electrode sheet. The negative-electrode sheet was cut into a rectangular shape and a copper lead was attached to an end thereof. Thus, a negative electrode plate 9 was produced.

$LiPF_6$ was dissolved in a concentration of 1 mol/l in a mixed solvent prepared by mixing ethylene carbonate and diethyl carbonate in a ratio of 1:1 by volume. Thus, a non-aqueous electrolyte was produced. This non-aqueous electrolyte had a water content regulated to below 20 ppm.

The positive electrode plate 7 and the negative electrode plate 9 were dried under reduced pressure at 120° C. for 12 hours. Subsequently, the positive electrode plate 7 was inserted into a bag, as a separator 8, obtained by forming a microporous polyethylene film into a bag shape. The positive electrode plate 7 with the separator 8 and the negative electrode plate 9 were alternately stacked in this order to obtain an electrode group composed of forty sheets of the positive electrode plate 7 with the separator and forty-one sheets of the negative electrode plate 9.

The electrode group was wrapped in an insulating film made of a polyethylene resin, and housed in a prismatic battery case 10 made of aluminum. The leads of each positive electrode plate 7 and of each negative electrode plate 9 were connected respectively to a positive terminal 5 and a negative terminal 4 attached to a cap 2 made of aluminum and having a safety vent 1. The positive terminal 5 and negative terminal 4 had been insulated from the cap 2 with a gasket 6 made of a polypropylene resin.

The cap 2 and the battery case 10 were laser-welded together at a laser-welded part 3. The non-aqueous electrolyte described above was charged into the battery case 10, which was then sealed. Thereafter, constant-current constant-voltage charge at a current of 0.1 ItA (10 hour rates) and 4.2 V was conducted, and constant-current discharge at a current of 0.1 ItA (10 hour rates) was conducted to a final voltage of 3.0 V. Thus, a prismatic non-aqueous electrolyte battery having a design capacity of 15 Ah was obtained.

(Initial Charge/Discharge Test)

With respect to each of the batteries of Examples 1 to 8 and batteries of Comparative Examples 1 to 4, two or more battery samples were subjected to ten cycles of initial charge/discharge at a temperature of 20° C. The charge was constant-current constant-voltage charge conducted under the conditions of a current of 0.1 ItA (10 hour rates) and 4.2 V, while the discharge was constant-current discharge conducted under the conditions of a current of 0.1 ItA (10 hour rates) and a final voltage of 3.0 V. The discharge capacity obtained in this test is referred to as "initial discharge capacity (mAh/g)".

(High-Rate Discharge Test)

Subsequently, a high-rate discharge test was conducted at a temperature of 20° C. The charge was constant-current constant-voltage charge conducted under the conditions of 0.2 ItA (5 hour rates) and 4.2 V, while the discharge was constant-current discharge conducted under the conditions of a current of 2.0 ItA (0.5 hour rates) and a final voltage of 3.0 V. The percentage of the discharge capacity in this test to the initial discharge capacity is referred to as "high-rate discharge performance value (%)".

(High-Temperature Charge Test)

A high-temperature charge test was conducted in the following manner. With respect to each of the batteries of Examples 1 to 8 and batteries of Comparative Examples 1 to 4, two or more battery samples in an end-of-discharge state were prepared. These batteries were placed in a thermostatic chamber having a set temperature of 60° C., and the temperature of the batteries was ascertained with a contact thermometer to have fully reached 60° C. Thereafter, constant-current constant-voltage charge at 0.2 ItA (5 hour rates) and 4.2 V was conducted, and the charge amperehour was measured. Using the following equation, the "high-temperature charge capacity increase ratio (%)" was calculated.

High-temperature charge capacity increase ratio (%)={(charge amperehour in high-temperature charge test)−(charge amperehour in initial charge/discharge test)}/(charge amperehour in initial charge/discharge test)×100

The results of the battery tests described above are shown in Table 1. An explanation is given on Table 1. The chemical composition formula for the positive active material used in each of the Examples and Comparative Examples is shown. The value of |b−c| and the value of d for each of these positive active materials represented by the (chemical composition formula 1) "$Li_aMn_bNi_cCo_dO_e$" are shown. The "initial discharge capacity (mAh/g)", the "high-rate discharge performance value (%)", and the "high-temperature charge capacity increase ratio (%)" are shown.

Figure 3:
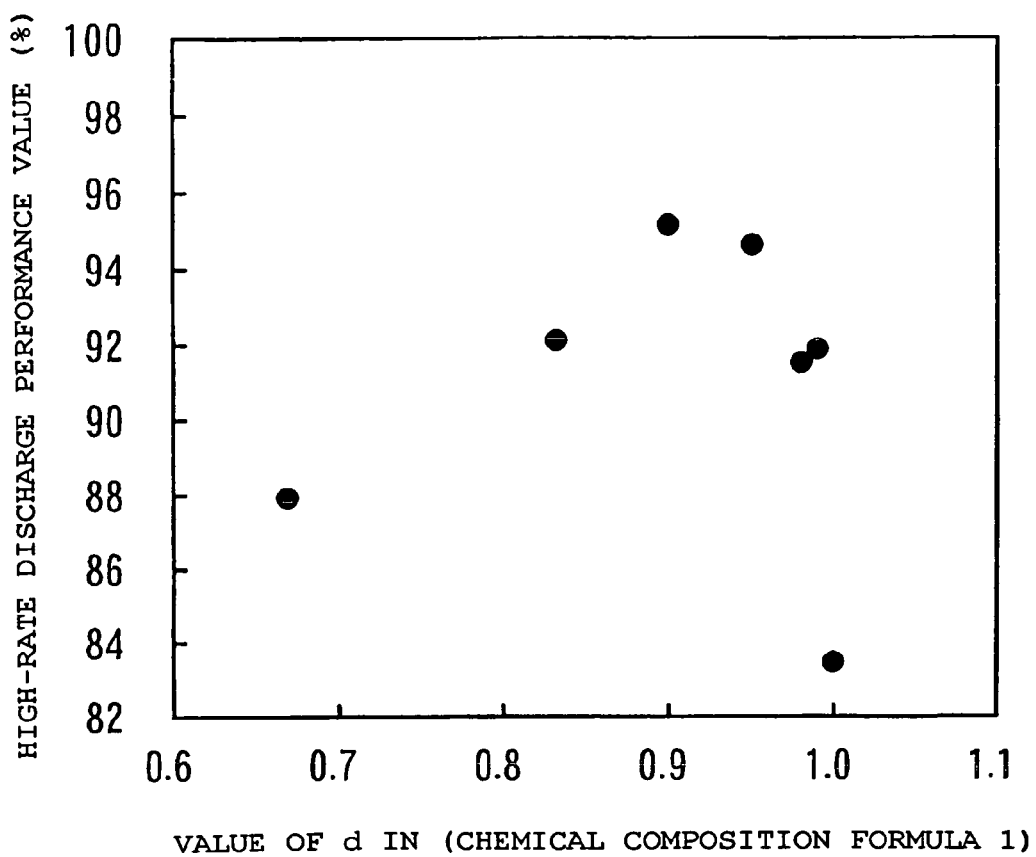
FIG. 3 is a graph showing the relationship between the chemical composition of a positive active material and a battery performance.
Figure 4:
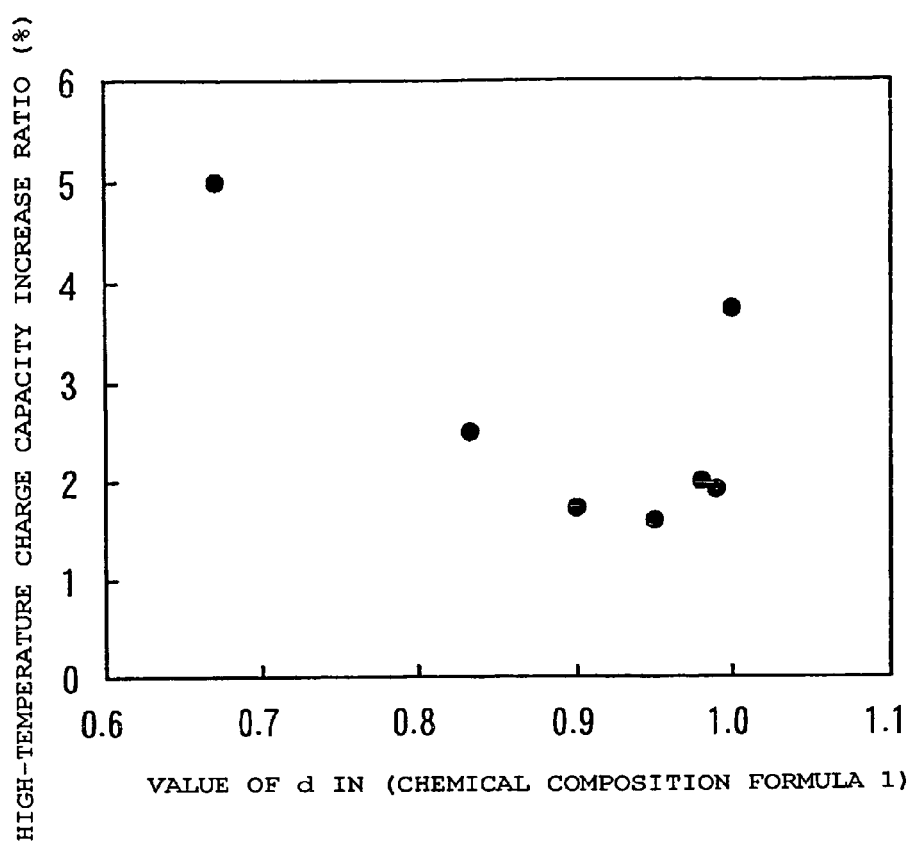
FIG. 4 is a graph showing the relationship between the chemical composition of a positive active material and a battery performance.

Furthermore, with respect to the results of the tests of the batteries of Examples 1 to 6, which employed a positive active material in which c=b, and the battery of Comparative Example 1, the values of the "high-rate discharge performance value (%)" and the "high-temperature charge capacity increase ratio (%)" are plotted against the values of d and shown in FIG. 3 and FIG. 4.

TABLE 1

| Battery | Composition | \|b−c\| | d | Initial discharge capacity (mAh/g) | High-rate discharge performance value (%) | High-temperature charge capacity increase (%) |
|---|---|---|---|---|---|---|
| Ex. 1 | $LiMn_{0.005}Ni_{0.005}Co_{0.99}O_2$ | 0 | 0.99 | 153 | 92 | 1.9 |
| Ex. 2 | $LiMn_{0.01}Ni_{0.01}Co_{0.98}O_2$ | 0 | 0.98 | 148 | 92 | 2.0 |
| Ex. 3 | $LiMn_{0.025}Ni_{0.025}Co_{0.95}O_2$ | 0 | 0.95 | 149 | 95 | 1.6 |
| Ex. 4 | $LiMn_{0.05}Ni_{0.05}Co_{0.90}O_2$ | 0 | 0.9 | 150 | 95 | 1.7 |
| Ex. 5 | $LiMn_{0.0835}Ni_{0.0835}Co_{0.833}O_2$ | 0 | 0.833 | 152 | 92 | 2.5 |
| Comp. Ex. 1 | $LiCoO_2$ | — | 1 | 156 | 83 | 3.7 |
| Ex. 6 | $LiMn_{0.165}Ni_{0.165}Co_{0.67}O_2$ | 0 | 0.67 | 151 | 88 | 5.0 |
| Ex. 7 | $LiMn_{0.04}Ni_{0.01}Co_{0.95}O_2$ | 0.03 | 0.95 | 146 | 92 | 3.0 |
| Ex. 8 | $LiMn_{0.01}Ni_{0.04}Co_{0.95}O_2$ | 0.03 | 0.95 | 151 | 94 | 4.0 |
| Comp. Ex. 2 | $LiMn_{0.25}Ni_{0.25}Co_{0.50}O_2$ | 0 | 0.5 | 149 | 87 | 5.3 |
| Comp. Ex. 3 | $LiMn_{0.13}Ni_{0.07}Co_{0.80}O_2$ | 0.06 | 0.8 | 148 | 92 | 3.0 |
| Comp. Ex. 4 | $LiMn_{0.07}Ni_{0.13}Co_{0.80}O_2$ | 0.06 | 0.8 | 149 | 90 | 2.4 |

Those results show the following. First, a comparison in battery test results between the batteries of Examples 1 to 6, which employed a positive active material in which |b−c|=0 in (chemical composition formula 1), and Comparative Example 1 shows that the batteries of Examples 1 to 6, in which d<1, had significantly improved high-rate discharge performance as compared with the comparative battery 1, in which d=1, while retaining a high discharge capacity. Especially in the case where d≧0.8, the high-rate discharge performance improved in higher degrees.

In particular, when 0.8≦d<1, then the high-temperature charge capacity increase ratio was far smaller. Namely, a positive active material inhibited from suffering excessive lithium ion extraction therefrom in high-temperature charge was obtained.

Next, a comparison in battery test results between the battery of Example 3 and the batteries of Examples 7 and 8, in which the value of d in (chemical composition formula 1) was 0.95, shows that the high-temperature charge capacity increase ratio was even more significantly reduced when |b−c|<0.03.

Regardless of whether the "Mn—Ni coating technique" in which a cobalt compound is coated with manganese and nickel is employed or the "coprecipitation process" in which manganese, nickel, and cobalt are coprecipitated is employed, the diffraction lines observed by X-ray diffractometry are limited to ones attributable to a single-phase structure of R3-m as long as the element constitution is within the range shown in Examples 1 to 6. This is supported by the fact that the products have the same tendency concerning electrical properties. It is presumed that when the proportion of cobalt is high as in these Examples, a single compound has been yielded because cobalt has high susceptibility to sintering.

For synthesizing a positive active material of the invention, either the "coprecipitation process" or the "Mn—Ni coating technique" may be used as described above. However, the inventors have ascertained that when the value of d is 0.7 or smaller, the "coprecipitation process" is more efficient than the "coating technique". This is because too large a coating amount may result in the separation of the manganese and nickel deposited on the cobalt compound, and because the manganese and nickel are highly likely to react with lithium before diffusion with cobalt and this is causative of the formation of an impurity phase.

Next, the non-aqueous electrolyte batteries of the invention are explained by means of Examples and Comparative Examples.

Active-Material Synthesis Example 1

$LiNi_{0.005}Mn_{0.005}Co_{0.99}O_2$ Coating Method (B-01a)
A positive active material was produced in the same manner as in Example 1. The composition thereof was ascertained to be $LiNi_{0.005}Mn_{0.005}Co_{0.99}O_2$. This is referred to as active material B-01a.

Active-Material Synthesis Example 2

$LiNi_{0.01}Mn_{0.01}Co_{0.98}O_2$ Coating Method (B-02a)
A positive active material was produced in the same manner as in Example 2. The composition thereof was ascertained to be $LiNi_{0.01}Mn_{0.01}Co_{0.98}O_2$. This is referred to as active material B-02a.

Active-Material Synthesis Example 3

$LiNi_{0.025}Mn_{0.025}Co_{0.95}O_2$ Coating Method (B-03a)
A positive active material was produced in the same manner as in Example 3. The composition thereof was ascertained to be $LiNi_{0.025}Mn_{0.025}Co_{0.95}O_2$. This is referred to as active material B-03a.

Active-Material Synthesis Example 4

$LiNi_{0.25}Mn_{0.25}Co_{0.95}O_2$ Coprecipitation Method (B-03b)
Into a closed type reaction vessel was introduced 3.5 l of water. Thereto was added 32% aqueous sodium hydroxide solution so as to result in a pH of 11.6. A stirrer having paddle type stirring blades was used to stir the solution at a rotational speed of 1,200 rpm and the temperature of the solution in the reaction vessel was kept at 50° C. with an external heater. Argon gas was bubbled into the solution in the reaction vessel to remove dissolved oxygen from the solution. A starting-material solution containing, dissolved therein, manganese sulfate pentahydrate (0.044 mol/l), nickel sulfate hexahydrate (0.044 mol/l), cobalt sulfate heptahydrate (1.670 mol/l), and hydrazine monohydrate (0.0101 mol/l) was prepared. This starting-material solution was continuously dropped into the reaction vessel at a flow rate of 3.17 ml/min. Simultaneously with this, 12 mol/l ammonia solution was dropped thereinto at a flow rate of 0.22 ml/min and mixed. A 32% aqueous solution of sodium hydroxide was intermittently introduced into the reaction vessel so that the pH of the solution in the reaction vessel was kept constant at 11.4±0.1. Furthermore, a heater was intermittently operated so that the temperature of the solution in the reaction vessel was kept constant at 50° C. Argon gas was directly bubbled into the liquid so that the atmosphere in the reaction vessel became a reducing atmosphere. Moreover, a flow pump was used to discharge a slurry from the system so that the liquid amount was always kept constant at 3.5 l. After 60 hours had passed since the reaction initiation and before 5 hours passed thereafter, a slurry of an Ni—Mn—Co composite oxide as a crystallization reaction product was taken out. The slurry obtained was washed with water, filtered, and dried at 80° C. overnight to obtain a dry powder of an Ni—Mn—Co coprecipitated precursor.

The Ni—Mn—Co coprecipitated precursor powder obtained was sieved to recover particles smaller than 75 μm. A lithium hydroxide monohydrate powder was weighed out so that Li/(Ni+Mn+Co)=1.0, and mixed with the particles by means of a planetary kneader. This mixture was charged into a pot made of alumina. Using an electric furnace, the mixture charged was, in a dry air stream, heated to 850° C. at a heating rate of 100° C./hr, held at the temperature of 850° C. for 15 hours, subsequently cooled to 200° C. at a cooling rate of 100° C./hr, and then allowed to cool. The powder obtained was sieved to recover particles of 75 μm or smaller. Thus, a powder of a lithium-nickel-manganese-cobalt composite oxide was obtained.

As a result of examination by X-ray diffractometry, the powder obtained was found to have a single-phase structure belonging to the space group R3-m. As a result of ICP, the composition was ascertained to be $LiNi_{0.025}Mn_{0.025}Co_{0.95}O_2$. This is referred to as active material B-03b.

Active-Material Synthesis Example 5

$LiNi_{0.05}Mn_{0.05}Co_{0.90}O_2$ Coating Method (B-04a)
A positive active material was produced in the same manner as in Example 4. The composition thereof was ascertained to be $LiNi_{0.05}Mn_{0.05}Co_{0.90}O_2$. This is referred to as active material B-04a.

Active-Material Synthesis Example 6

$LiNi_{0.0835}Mn_{0.0835}Co_{0.833}O_2$ Coprecipitation Method (B-05b)
A positive active material was produced in the same manner as in Example 5. The composition thereof was ascertained to be $LiNi_{0.0835}Mn_{0.0835}Co_{0.833}O_2$. This is referred to as active material B-05b.

Active-Material Synthesis Example 7

$LiCoO_2$ Coating (B-Co)
A positive active material was produced in the same manner as in Comparative Example 1. The composition thereof was ascertained to be $LiCoO_2$. This is referred to as active material B-Co.

Active-Material Synthesis Example 8

$LiNi_{0.165}Mn_{0.165}Co_{0.67}O_2$ Coating Method (B-11a)
A positive active material was produced in the same manner as in Example 6. The composition thereof was ascertained to be $LiNi_{0.165}Mn_{0.165}Co_{0.67}O_2$. This is referred to as active material B-11a.

Active-Material Synthesis Example 9

$LiNi_{0.01}Mn_{0.04}Co_{0.95}O_2$ Coating Method (B-12a)
A positive active material was produced in the same manner as in Example 7. The composition thereof was ascertained to be $LiNi_{0.01}Mn_{0.04}Co_{0.95}O_2$. This is referred to as active material B-12a.

Active-Material Synthesis Example 10

$LiNi_{0.04}Mn_{0.01}Co_{0.95}O_2$ Coprecipitation Method (B-13b)
A powder was obtained in the same manner as in the (Active Material Synthesis Example 4), except that the starting-material solution used was one containing, dissolved therein, manganese sulfate pentahydrate (0.0176 mol/l), nickel sulfate hexahydrate (0.0703 mol/l), cobalt sulfate heptahydrate (1.67 mol/l), and hydrazine monohydrate (0.0101 mol/l).

As a result of examination by X-ray diffractometry, the powder obtained was found to have a single-phase structure belonging to the space group R3-m. As a result of ICP, the composition was ascertained to be $LiNi_{0.04}Mn_{0.01}Co_{0.95}O_2$. This is referred to as active material B-13b.

Active-Material Synthesis Example 11

$LiNi_{0.42}Mn_{0.42}Co_{0.16}O_2$ Coprecipitation Method (B-14b)
A powder was obtained in the same manner as in the (Active Material Synthesis Example 4), except that the starting-material solution used was one containing, dissolved therein, manganese sulfate pentahydrate (0.738 mol/l), nickel sulfate hexahydrate (0.738 mol/l), cobalt sulfate heptahydrate (0.282 mol/l), and hydrazine monohydrate (0.0101 mol/l).

As a result of examination by X-ray diffractometry, the powder obtained was found to have a single-phase structure belonging to the space group R3-m. As a result of ICP, the composition was ascertained to be $LiNi_{0.42}Mn_{0.42}Co_{0.16}O_2$. This is referred to as active material B-14b.

Active-Material Synthesis Example 12

$LiNi_{0.25}Mn_{0.25}Co_{0.5}O_2$ Coprecipitation Method (B-15b)
A powder was obtained in the same manner as in the (Active Material Synthesis Example 4), except that the starting-material solution used was one containing, dissolved therein, manganese sulfate pentahydrate (0.439 mol/l), nickel sulfate hexahydrate (0.439 mol/l), cobalt sulfate heptahydrate (0.88 mol/l), and hydrazine monohydrate (0.0101 mol/l).

As a result of examination by X-ray diffractometry, the powder obtained was found to have a single-phase structure belonging to the space group R3-m. As a result of ICP, the composition was ascertained to be $LiNi_{0.25}Mn_{0.25}Co_{0.5}O_2$. This is referred to as active material B-15b.

[Preparation of Lithium-Manganese Oxide]

LiOH and $MnO_2$ were mixed together in an Li:Mn element ratio of 1.08:1.92 and suspended in water to obtain an aqueous suspension solution. This aqueous suspension solution was dried under reduced pressure with a rotary evaporator to obtain a solid salt mixture. In a stream of dry air (oxygen content, 20%), the salt mixture was sintered at a temperature of 450° C. for 12 hours and then heat-treated at a temperature of 800° C. for 24 hours to obtain a sintering product. This sintering product was examined by X-ray diffractometry. As a result, a lithium-manganese oxide having a spinel structure represented by the general formula $LiMn_2O_4$ was ascertained. As a result of elemental analysis, the composition of the product was ascertained to be $Li_{1.08}Mn_{1.92}O_4$. This is referred to as active material A.

Figure 2:
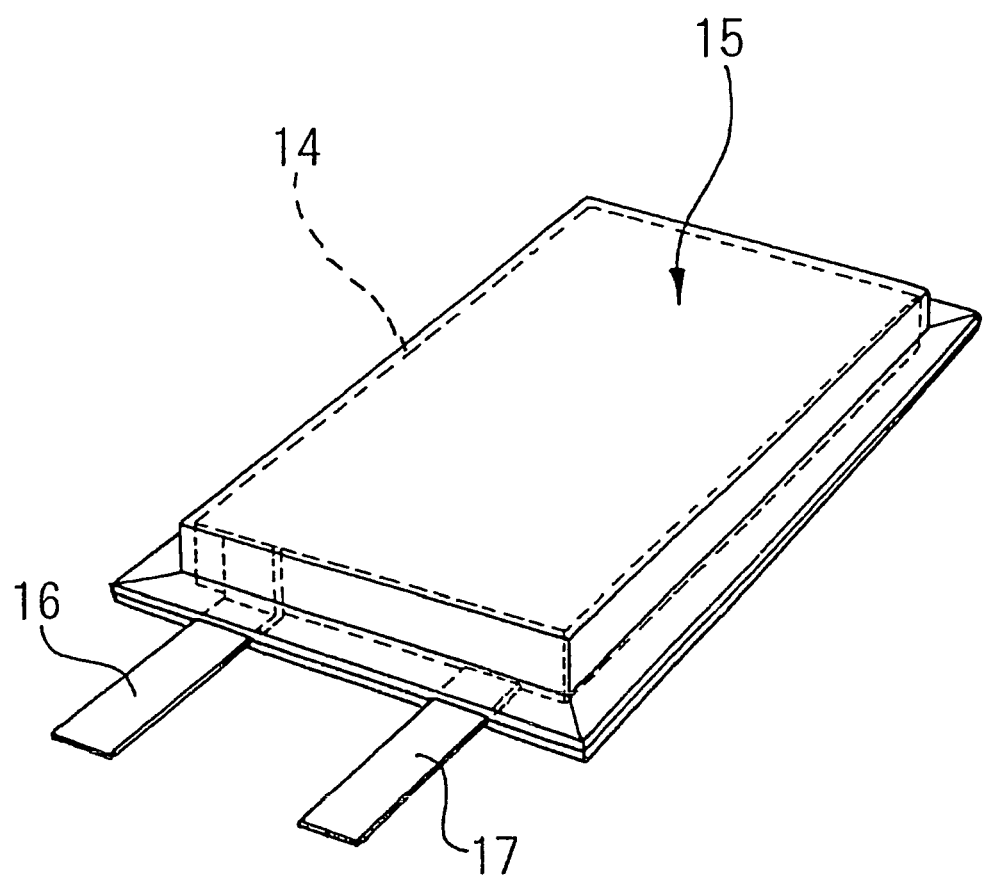
FIG. 2 is a diagrammatic slant view of the batteries of Examples 9 to 16, Comparative Examples 5 and 6, and Reference Example 1.

The active material was used as a positive active material to fabricate non-aqueous electrolyte batteries shown in FIG. 2 in the following manner. These batteries are referred to as batteries of Examples 9 to 16, Comparative Examples 5 and 6, and Comparative Example 1.

The positive active material, acetylene black as a conductive material, and poly(vinylidene fluoride) (PVdF) as a binder are mixed together in a weight ratio of 85:10:5. Thereto is added N-methyl-2-pyrrolidone (NMP). The resultant mixture is sufficiently kneaded to obtain a positive-electrode paste. The positive-electrode paste is applied to each side of an aluminum foil current collector having a thickness of 20 μm. The current collector coated is pressed to produce a positive electrode. A positive terminal 16 is welded to the positive electrode by ultrasonic welding.

Artificial graphite (average particle diameter, 6 μm; lattice spacing as determined by X-ray diffractometry ($d_{002}$), 0.337 nm; crystallite size in c-axis direction (Lc), 55 nm) as a negative-electrode material is mixed with N-methyl-2-pyrrolidone (NMP), and this mixture is sufficiently kneaded to obtain a negative-electrode paste. Subsequently, the negative-electrode paste is applied to each side of a copper foil current collector having a thickness of 15 μm. The copper foil coated is pressed to produce a negative electrode. A negative terminal 17 is welded to the negative electrode by resistance welding.

A microporous film made of polypropylene is used as a separator. The separator and the electrodes are stacked in the order of negative electrode/separator/positive electrode, and the resultant assemblage is wound into a flat shape to obtain an electrode group 14.

$LiPF_6$ as a fluorine-containing electrolyte salt was dissolved in a concentration of 1 mol/l in a mixed solvent prepared by mixing ethylene carbonate and diethyl carbonate in a ratio of 1:1 by volume to prepare a liquid electrolyte. This liquid electrolyte had a water content regulated to below 20 ppm. This solution is used as a non-aqueous electrolyte.

As a facing body 15 is used a metal/resin laminate film consisting of poly(ethylene terephthalate) (15 μm)/aluminum foil (50 μm)/metal-bondable polypropylene film (50 μm). The facing body 15 excluding its part serving as a fluid injection hole is airtightly sealed so that the free ends of the positive terminal 16 and negative terminal 17 are exposed outside.

A certain amount of the non-aqueous electrolyte is injected through the fluid injection hole. Thereafter, the fluid injection hole part is heat-sealed under vacuum to fabricate a flat type lithium secondary battery having a design capacity of 800 mAh.

The batteries obtained were subjected to the following evaluation tests.

(Initial Charge/Discharge Test)

First, ten cycles of initial charge/discharge are conducted at a temperature of 25° C. The charge is constant-current constant-voltage charge conducted under the conditions of a current of 0.1 ItA (10 hour rates), 4.2 V, and 15 hours, while the discharge is constant-current discharge conducted under the conditions of a current of 0.1 ItA (10 hour rates) and a final voltage of 3.0 V. The discharge capacity obtained in this test is referred to as "initial discharge capacity (mAh/g)".

(High-Rate Discharge Test)

Subsequently, a high-rate discharge test is conducted at a temperature of 25° C. The charge is constant-current constant-voltage charge conducted under the conditions of 0.2 ItA (5 hour rates) and 4.2 V, while the discharge is constant-current discharge conducted under the conditions of a current of 2.0 ItA (0.5 hour rates) and a final voltage of 3.0 V. The percentage of the discharge capacity in this test to the initial discharge capacity is referred to as "high-rate discharge performance value (%)".

(High-Temperature Charge Test)

A high-temperature charge test was conducted in the same manner as in Example 1.

(Storage Test)

Subsequently to the initial charge/discharge test, two or more battery samples in an end-of-charge state are prepared with respect to each battery and allowed to stand in a 50° C. thermostatic chamber for 7 days. The batteries are taken out of the thermostatic chamber and subjected at a temperature of 20° C. to constant-current discharge at a current of 0.1 ItA to a final voltage of 3.0 V to determine the "discharge capacity after storage". With respect to each battery, the "self discharge rate (%)" is calculated using the following equation.

Self discharge rate (%)=[(discharge capacity before storage)−(discharge capacity after storage)]/(discharge capacity before storage)×100

One cycle of charge/discharge is then conducted under the same conditions as in the initial charge/discharge test. The discharge capacity obtained in this cycle is referred to as "recovered discharge capacity". With respect to each battery, the ratio of the recovered discharge capacity to the "discharge capacity before storage" is determined. This ratio is referred to as "capacity recovery rate (%)".

(Nail Penetration Test)

A battery in an end-of-charge state is prepared which has undergone constant-current constant-voltage charge at 1.5 A and 4.2 V for 15 hours. An iron nail having a diameter of 3 mm and a metallic sheen is penetrated into the battery in a direction perpendicular to the electrode planes at a rate of 100 mm/sec to the depth corresponding to two-thirds the thickness of the battery.

The active materials obtained in the (Active-Material Synthesis Examples 1 to 12) described above each were used alone as a positive active material to fabricate a battery. These batteries were subjected to the evaluation tests. The results are shown in Table 2 together with the names of the active materials. In the case of the lithium-nickel-manganese-cobalt composite oxides, the value of |b−c| and value of d in the general formula $Li_aMn_bNi_cCo_dO_e$ are also shown.

TABLE 2

| Name of active material | Composition | |b−c| | d | Initial discharge capacity (mAh/g) | High-rate discharge performance value (%) | High-temperature charge capacity increase (%) |
|---|---|---|---|---|---|---|
| B01-a | $LiMn_{0.005}Ni_{0.005}Co_{0.99}O_2$ | 0 | 0.99 | 153 | 92 | 1.9 |
| B02-a | $LiMn_{0.01}Ni_{0.01}Co_{0.98}O_2$ | 0 | 0.98 | 148 | 92 | 2.0 |

TABLE 2-continued

| Name of active material | Composition | \|b-c\| | d | Initial discharge capacity (mAh/g) | High-rate discharge performance value (%) | High-temperature charge capacity increase (%) |
|---|---|---|---|---|---|---|
| B03-a | $LiMn_{0.025}Ni_{0.025}Co_{0.95}O_2$ | 0 | 0.95 | 149 | 95 | 1.6 |
| B03-b | $LiMn_{0.025}Ni_{0.025}Co_{0.95}O_2$ | 0 | 0.95 | 149 | 95 | 1.6 |
| B04-a | $LiMn_{0.05}Ni_{0.05}Co_{0.90}O_2$ | 0 | 0.9 | 150 | 95 | 1.7 |
| B05-b | $LiMn_{0.0835}Ni_{0.0835}Co_{0.833}O_2$ | 0 | 0.833 | 152 | 92 | 2.5 |
| B-Co | $LiCoO_2$ | — | 1 | 156 | 83 | 3.7 |
| B11-a | $LiMn_{0.165}Ni_{0.165}Co_{0.67}O_2$ | 0 | 0.67 | 151 | 88 | 5.0 |
| B12-a | $LiMn_{0.04}Ni_{0.01}Co_{0.95}O_2$ | 0.03 | 0.95 | 146 | 92 | 3.0 |
| B13-b | $LiMn_{0.01}Ni_{0.04}Co_{0.95}O_2$ | 0.03 | 0.95 | 151 | 94 | 4.0 |
| B14-b | $LiMn_{0.42}Ni_{0.42}Co_{0.16}O_2$ | 0 | 0.16 | 158 | 83 | 9.1 |
| B15-b | $LiMn_{0.25}Ni_{0.25}Co_{0.50}O_2$ | 0 | 0.5 | 155 | 86 | 7.3 |
| A | $Li_{1.08}Mn_{1.92}O_4$ | — | — | 94 | 91 | 2.3 |

Performance differences brought about by a difference in synthesis method will be discussed. As apparent from Table 2, active material B-03a, which was synthesized by the coating method, and active material B-03b, which was synthesized by the coprecipitation method, both have a composition represented by $LiNi_{0.025}Mn_{0.025}Co_{0.95}O_2$. It can be seen from the results that the two active materials are equal in battery performance.

Actually, regardless of whether the "Mn—Ni coating technique" in which a cobalt compound is coated with manganese and nickel is employed or the "coprecipitation process" in which manganese, nickel, and cobalt are coprecipitated is employed, the diffraction lines observed by X-ray diffractometry are limited to ones attributable to a single-phase structure of R3-m as long as the composition is within the range shown here. This is supported by the fact that the active materials have the same tendency concerning electrical properties. It is presumed that when the proportion of cobalt is high as in those active materials, a single compound has been yielded because cobalt has high susceptibility to sintering.

As stated above, either the "coprecipitation process" or the "Mn—Ni coating technique" may be used for synthesizing the lithium-nickel-manganese-cobalt composite oxide (B) to be used in the invention. However, the inventors have ascertained that when the value of d is 0.7 or smaller, the "coprecipitation process" is more effective than the "coating technique". This is because too large a coating amount may result in the separation of the manganese and nickel deposited on the cobalt compound. The following is further thought. The diffusion of the manganese and nickel, especially manganese, does not proceed during sintering and these elements tend to preferentially combine with lithium. There is hence the high possibility that an impurity phase might be apt to generate to inhibit an Mn—Ni—Co solid solution from generating satisfactorily, resulting in a difference in performance.

Preferred compositional ranges for the lithium-nickel-manganese-cobalt composite oxide (B) will be discussed next. It can be clearly seen from Table 2 that when $|b-c|<0.03$ and $0.8 \leq d<1$ in the general formula $Li_aMn_bNi_cCo_dO_e$, then the high-temperature charge capacity increase ratio has been reduced to an even smaller value. Namely, a positive active material inhibited from suffering excessive lithium ion extraction therefrom even in high-temperature charge was obtained.

Example 9

The "active material A" was used as a lithium-manganese oxide (A) and the "active material B-03b" was used as a lithium-nickel-manganese-cobalt composite oxide (B). A mixture of the (A) and (B) in a weight ratio of (A):(B)=95:5 was used as a positive active material to fabricate a battery. This battery is referred to as the battery of Example 9.

Example 10

A battery was fabricated in the same manner as in Example 9, except that a mixture of the (A) and (B) in a weight ratio of (A):(B)=90:10 was used as a positive active material. This battery is referred to as the battery of Example 10.

Example 11

A battery was fabricated in the same manner as in Example 9, except that a mixture of the (A) and (B) in a weight ratio of (A):(B)=70:30 was used as a positive active material. This battery is referred to as the battery of Example 11.

Example 12

A battery was fabricated in the same manner as in Example 9, except that a mixture of the (A) and (B) in a weight ratio of (A):(B)=50:50 was used as a positive active material. This battery is referred to as the battery of Example 12.

Example 13

A battery was fabricated in the same manner as in Example 9, except that a mixture of the (A) and (B) in a weight ratio of (A):(B)=30:70 was used as a positive active material. This battery is referred to as the battery of Example 13.

Example 14

A battery was fabricated in the same manner as in Example 9, except that a mixture of the (A) and (B) in a weight ratio of (A):(B)=10:90 was used as a positive active material. This battery is referred to as the battery of Example 14.

Example 15

A battery was fabricated in the same manner as in Example 9, except that a mixture of the (A) and (B) in a weight ratio of (A):(B)=5:95 was used as a positive active material. This battery is referred to as the battery of Example 15.

Example 16

The "active material A" was used as a lithium-manganese oxide (A) and the "active material B-05b" was used as a lithium-nickel-manganese-cobalt composite oxide (B). A mixture of the (A) and (B) in a weight ratio of (A):(B)=50:50 was used as a positive active material to fabricate a battery. This battery is referred to as the battery of Example 16.

Comparative Example 5

A battery employing the "active material A" as the only positive active material is referred to as the battery of Comparative Example 5.

Reference Example 1

A battery employing the "active material B-03b" as the only positive active material is referred to as the battery of Reference Example 1.

Comparative Example 6

The "active material A" was used as a lithium-manganese oxide (A) and the "active material B-15b" was used as a lithium-nickel-manganese-cobalt composite oxide (B). A mixture of the (A) and (B) in a weight ratio of (A):(B)=50:50 was used as a positive active material to fabricate a battery. This battery is referred to as the battery of Comparative Example 6.

The results of the initial charge/discharge test, high-rate discharge test, and storage test of the batteries of Examples 9 to 16, batteries of Comparative Examples 5 and 6, and battery of Reference Example 1 are shown in Table 3.

The batteries which had been subjected to the initial capacity test were subjected to the "nail penetration test". Whether the emission of white smoke from the nail penetration part was observed or not upon nail penetrating was examined as a criterion for evaluation. In Table 3, the battery on which white smoke was observed is indicated by "x" and the batteries on which white smoke was not observed are indicated by "o".

A comparison between the batteries of Examples 9 to 15 and the battery of Comparative Example 5 shows that an increase in charge/discharge capacity is attained by mixing a lithium-nickel-manganese-cobalt composite oxide (B) with a lithium-manganese oxide (A). This indicates that the mixing of a lithium-nickel-manganese-cobalt composite oxide (B) with a lithium-manganese oxide (A) does not inhibit lithium insertion/extraction reactions.

Furthermore, by mixing a lithium-nickel-manganese-cobalt composite oxide (B) with a lithium-manganese oxide (A), the self discharge rate, which is regarded as a shortcoming of the lithium-manganese oxide (A), was restrained and storage performance including recovery thereafter was improved. This indicates that the mixing of a lithium-nickel-manganese-cobalt composite oxide (B) with a lithium-manganese oxide (A) has the function of improving the storage performance of the lithium-manganese oxide (A) itself. It can be further seen that the proportion of the lithium-manganese oxide (A) to the lithium-nickel-manganese-cobalt composite oxide (B) to be mixed therewith is preferably from 5:95 to 90:10, especially preferably from 30:70 to 90:10.

Factors which bring about that function include the following. When a lithium-nickel-manganese-cobalt composite oxide (B) is mixed with a lithium-manganese oxide (A), the lithium-nickel-manganese-cobalt composite oxide (B) serves to inhibit the dissolution of $Mn^{2+}$ from the lithium-manganese oxide (A) during storage. However, the mechanism thereof has not been elucidated.

It can be furthermore seen that the mixing of a lithium-nickel-manganese-cobalt composite oxide (B) with a lithium-manganese oxide (A) resulted in improved high-rate discharge performance. However, as can be seen from the results for the battery of Comparative Example 6, when a lithium-nickel-manganese-cobalt composite oxide having a small cobalt proportion was incorporated, the battery had poorer high-rate discharge characteristics not only than the batteries of Examples 9 to 16 but also than the battery of Comparative Example 5, which employed the lithium-manganese oxide (A) alone. Since the cobalt proportion in the lithium-nickel-manganese-cobalt composite oxide (B) considerably influences the high-rate discharge performance of the battery as shown above, it is important that the value of d in the general formula $Li_aMn_bNi_cCo_dO_e$ should be 0.6 or larger, preferably 0.8 or larger, and it is preferred that $0.8 \leq d < 1$.

Moreover, as a result of the nail penetration test, the emission of white smoke from the nail penetration part was observed on the battery of Reference Example 1, which

TABLE 3

| Battery | Name of active material B | Proportion of B (wt %) | Initial discharge capacity (mAh/g) | High-rate discharge performance value (%) | Self-discharge rate (%) | Capacity recovery rate (%) | Nail penetration test |
| --- | --- | --- | --- | --- | --- | --- | --- |
| Comp. Ex. 5 | — | 0 | 94 | 91.0 | 15.4 | 90.9 | o |
| Ex. 9 | B-03b | 5 | 97 | 91.1 | 15.3 | 91.0 | o |
| Ex. 10 | B-03b | 10 | 100 | 91.4 | 14.8 | 91.6 | o |
| Ex. 11 | B-03b | 30 | 114 | 91.8 | 12.0 | 94.2 | o |
| Ex. 12 | B-03b | 50 | 119 | 92.2 | 10.9 | 96.0 | o |
| Ex. 13 | B-03b | 70 | 133 | 92.6 | 10.2 | 97.1 | o |
| Ex. 14 | B-03b | 90 | 144 | 93.8 | 9.6 | 97.9 | o |
| Ex. 15 | B-03b | 95 | 146 | 94.8 | 9.5 | 98.0 | o |
| Re. Ex. 1 | B-03b | 100 | 149 | 95.0 | 9.5 | 98.0 | x |
| Ex. 16 | B-05b | 50 | 120 | 91.1 | 10.7 | 96.2 | o |
| Comp. Ex. 6 | B-15b | 50 | 117 | 87.3 | 9.3 | 96.7 | o | employed a lithium-nickel-manganese-cobalt composite oxide (B) alone as a positive active material. In contrast, white smoke was not observed on the other batteries, which employed a positive active material into which a lithium-manganese oxide (A) had been incorporated, and the thermal stability characteristic of the lithium-manganese oxide (A) was retained. Since the batteries of the invention, which employ a mixture of the lithium-manganese oxide (A) and the lithium-nickel-manganese-cobalt composite oxide (B) in the positive electrode, have better thermal stability than the battery employing the lithium-nickel-manganese-cobalt composite oxide (B) alone as apparent from the results, they are suitable for use as high-capacity large batteries required to have especially high thermal stability. Furthermore, as can be seen from the fact that the batteries of Examples 9 to 15 were low-capacity flat type lithium secondary batteries having a design capacity of 800 mAh, it is a matter of course that the batteries of the invention, which employ a mixture of the lithium-manganese oxide (A) and the lithium-nickel-manganese-cobalt composite oxide (B) in the positive electrode, are suitable for use as low-capacity small batteries because the effect of improving thermal stability of the invention is produced in these batteries also.

INDUSTRIAL APPLICABILITY

According to the invention, a positive active material can be provided which can give a battery having high energy density and excellent high-rate discharge performance and inhibited from decreasing in battery performance even in the case of high-temperature charge. A non-aqueous electrolyte battery employing this positive active material can also be provided.

Furthermore, a non-aqueous electrolyte battery which retains the high thermal stability characteristics of lithium-manganese oxides having a spinel structure, has a high energy density and excellent high-rate discharge performance, is inhibited from suffering self-discharge, and has excellent storage performance can be provided according to the invention.

The invention claimed is:

1. A positive active material comprising:
a composite oxide which comprises lithium (Li), manganese (Mn), nickel (Ni), cobalt (Co), and oxygen (O) and is represented by the following chemical composition formula:

$Li_aMn_bNi_cCo_dO_e$ (Chemical composition formula 1)

wherein $0<a\leq1.3$
$|b-c|\leq0.05$
$0.6\leq d<1$
$1.7\leq e\leq2.3$
$b+c+d=1$, and wherein said composite oxide shows a single-phase structure belonging to space group R3-m as a result of examination by X-ray diffractometry.

2. A non-aqueous electrolyte battery, comprising:
a positive electrode including the positive active material of claim 1;
a negative electrode; and
a non-aqueous electrolyte.

3. The positive active material of claim 1, wherein $b+c\leq0.4$.

4. The positive active material of claim 1, wherein $0<c-b\leq0.05$.

5. The positive active material of claim 1, wherein said composite oxide consists essentially of a single-phase structure belonging to space group R3-m.

6. The positive active material of claim 1, wherein diffraction lines observed by X-ray diffractometry for said composite oxide are limited to lines attributable to a single-phase structure belonging to space group R3-m.

7. The positive active material of claim 1, wherein $b+c\leq0.4$, $0<c-b\leq0.05$, and $0.6\leq d\leq0.833$.

8. The positive active material of claim 1, wherein $|b-c|=0$ and $0.6\leq d\leq0.833$.

9. A positive active material comprising:
a composite oxide which comprises lithium (Li), manganese (Mn), nickel (Ni), cobalt (Co), and oxygen (O) and is represented by the following chemical composition formula:

$Li_aMn_bNi_cCo_dO_e$ (Chemical composition formula 1)

wherein $0<a\leq1.3$
$|b-c|<0.03$
$0.8\leq d<1$
$1.7\leq e<2.3$
$b+c+d=1$, and wherein said composite oxide shows a single-phase structure belonging to space group R3-m as a result of examination by X-ray diffractometry.

10. A non-aqueous electrolyte battery, comprising:
a positive electrode including the positive active material of claim 9;
a negative electrode; and
a non-aqueous electrolyte.

11. A non-aqueous electrolyte battery, comprising:
a positive electrode, a negative electrode, and a non-aqueous electrolyte,
wherein the positive electrode comprises a lithium-manganese oxide (A) having a spinel structure and represented by the general formula $LiMn_2O_4$ and a lithium-nickel-manganese-cobalt composite oxide (B) having an α-NaFeO$_2$ layer structure and represented by the general formula $Li_aMn_bNi_cCo_dO_e$,
wherein a weight ratio of (A) to (B) is in a range from 5:95 to 10:90,
wherein
$0<a\leq1.3$
$|b-c|\leq0.05$
$0.6\leq d<1$
$1.7\leq e\leq2.3$
$b+c+d=1$, and
wherein said composite oxide shows a single-phase structure belonging to space group R3-m as a result of examination by X-ray diffractometry.

12. A non-aqueous electrolyte battery, comprising:
a positive electrode, a negative electrode, and a non-aqueous electrolyte,
wherein the positive electrode comprises a lithium-manganese oxide (A) having a spinel structure and represented by the general formula $LiMn_2O_4$ and a lithium-nickel-manganese-cobalt composite oxide (B) having an α-NaFeO$_2$ layer structure and represented by the general formula $Li_aMn_bNi_cCo_dO_e$,
wherein a weight ratio of (A) to (B) is in a range from 5:95 to 10:90, wherein
  $0 < a \leq 1.3$
  $|b-c| < 0.03$
  $0.8 \leq d < 1$
  $1.7 \leq e \leq 2.3$
  $b+c+d=1$, and
wherein said composite oxide shows a single-phase structure belonging to space group R3-m as a result of examination by X-ray diffractometry.

13. A positive active material comprising:
a composite oxide which comprises lithium (Li), manganese (Mn), nickel (Ni), cobalt (Co), and oxygen (O) and is represented by the following chemical composition formula:

$Li_a Mn_b Ni_c Co_d O_e$   (Chemical composition formula 1)

wherein $0 < a \leq 1.3$
  $|b-c| \leq 0.05$
  $0.6 \leq d \leq 0.833$
  $1.7 \leq e \leq 2.3$
  $b+c+d=1$, and
wherein said composite oxide shows a single-phase structure belonging to space group R3-m as a result of examination by X-ray diffractometry.

14. A non-aqueous electrolyte battery, comprising:
a positive electrode including the positive active material of claim 13;
a negative electrode; and
a non-aqueous electrolyte.

15. A positive active material comprising:
a composite oxide which comprises lithium (Li), manganese (Mn), nickel (Ni), cobalt (Co), and oxygen (O) and is represented by the following chemical composition formula:

$Li_a Mn_b Ni_c Co_d O_e$   (Chemical composition formula 1)

wherein $0 < a \leq 1.3$
  $|b-c| < 0.03$
  $0.8 \leq d \leq 0.833$
  $1.7 \leq e \leq 2.3$
  $b+c+d=1$, and
wherein said composite oxide shows a single-phase structure belonging to space group R3-m as a result of examination by X-ray diffractometry.

16. A non-aqueous electrolyte battery, comprising:
a positive electrode including the positive active material of claim 15;
a negative electrode; and
a non-aqueous electrolyte.

17. A non-aqueous electrolyte battery, comprising:
a positive electrode, a negative electrode, and a non-aqueous electrolyte,
wherein the positive electrode comprises a lithium-manganese oxide (A) having a spinel structure and represented by the general formula $LiMn_2O_4$ and a lithium-nickel-manganese-cobalt composite oxide (B) having an $\alpha$-$NaFeO_2$ layer structure and represented by the general formula $Li_a Mn_b Ni_c Co_d O_e$,
wherein
  $0 < a \leq 1.3$
  $|b-c| \leq 0.05$
  $0.9 \leq d < 1$
  $1.7 \leq e \leq 2.3$
  $b+c+d=1$
  $b < 0.05$, and
wherein said composite oxide shows a single-phase structure belonging to space group R3-m as a result of examination by X-ray diffractometry.

18. The non-aqueous electrolyte battery of claim 17, wherein the positive electrode includes (A) and the (B) in a proportion (weight ratio) of from 5:95 to 90:10.

19. A non-aqueous electrolyte battery, comprising:
a positive electrode, a negative electrode, and a non-aqueous electrolyte,
wherein the positive electrode comprises a lithium-manganese oxide (A) having a spinel structure and represented by the general formula $LiMn_2O_4$ and a lithium-nickel-manganese-cobalt composite oxide (B) having an $\alpha$-$NaFeO_2$ layer structure and represented by the general formula $Li_a Mn_b Ni_c Co_d O_e$,
wherein
  $0 < a \leq 1.3$
  $|b-c| < 0.03$
  $0.9 \leq d < 1$
  $1.7 \leq e \leq 2.3$
  $b+c+d=1$
  $b < 0.05$, and
wherein said composite oxide shows a single-phase structure belonging to space group R3-m as a result of examination by X-ray diffractometry.

20. The non-aqueous electrolyte battery of claim 19, wherein the positive electrode includes (A) and the (B) in a proportion (weight ratio) of from 5:95 to 90:10.

* * * * *